(12) United States Patent
Viswanatha et al.

(10) Patent No.: US 11,585,926 B2
(45) Date of Patent: Feb. 21, 2023

(54) TECHNIQUES FOR GHOSTING MITIGATION IN COHERENT LIDAR SYSTEMS USING MULTIPLE CHIRP RATES

(71) Applicant: AEVA, INC., Mountain View, CA (US)

(72) Inventors: Kumar Bhargav Viswanatha, Santa Clara, CA (US); Carlo Giustini, Mountain View, CA (US); Esha John, Sunnyvale, CA (US); Jose Krause Perin, Mountain View, CA (US); James Nakamura, Chicago, IL (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/702,601

(22) Filed: Mar. 23, 2022

(65) Prior Publication Data

US 2022/0308217 A1 Sep. 29, 2022

Related U.S. Application Data

(60) Provisional application No. 63/165,628, filed on Mar. 24, 2021.

(51) Int. Cl.
*G01C 3/08* (2006.01)
*G01S 17/32* (2020.01)
*G01S 7/493* (2006.01)
*G01S 17/58* (2006.01)

(52) U.S. Cl.
CPC ............. *G01S 17/32* (2013.01); *G01S 7/493* (2013.01); *G01S 17/58* (2013.01)

(58) Field of Classification Search
None
See application file for complete search history.

(56) References Cited

U.S. PATENT DOCUMENTS

| 11,360,214 B2 * | 6/2022 | John | .............. G01S 17/10 |
| 2022/0011417 A1 * | 1/2022 | Hao | .............. G01S 17/931 |
| 2022/0011423 A1 * | 1/2022 | Li | .............. G01S 13/584 |

FOREIGN PATENT DOCUMENTS

| WO | 2018160240 A2 | 9/2018 | |
| WO | WO 2018160240 A2 * | 9/2018 | ............. G01S 7/102 |
| WO | 2020018805 A1 | 1/2020 | |

OTHER PUBLICATIONS

International Search Report and Written Opinion dated Jun. 29, 2022 from International Application PCT/US2022/021788 filed Mar. 24, 2022; p. 16.

* cited by examiner

*Primary Examiner* — Mark Hellner
(74) *Attorney, Agent, or Firm* — Womble Bond Dickinson (US) LLP

(57) ABSTRACT

A light detection and ranging (LIDAR) system to transmit optical beams including at least two up-chirp signals and at least two down-chirp signals toward targets in a field of view of the LIDAR system and receive returned signals of the up-chirp and the down-chirp as reflected from the targets. The LIDAR system generates a baseband signal in a frequency domain of the returned signals of the at least two up-chirp signals and the at least two down-chirp signals. The baseband signal includes a first set of peaks associated with the at least one up-chirp signal and a second set of peaks associated with the at least one down-chirp signal. The LIDAR system determines the target location using the first set of peaks and the second set of peaks.

20 Claims, 14 Drawing Sheets

TECHNIQUES FOR GHOSTING MITIGATION IN COHERENT LIDAR SYSTEMS USING MULTIPLE CHIRP RATES

RELATED APPLICATIONS

This application claims priority from and the benefit of U.S. Provisional Patent Application No. 63/165,628 filed on Mar. 24, 2021, the entire contents of which are incorporated herein by reference in their entirety.

FIELD

The present disclosure is related to LIDAR (light detection and ranging) systems in general, and more particularly to ghosting mitigation in coherent LIDAR systems.

BACKGROUND

LIDAR systems, such as frequency-modulated continuous-wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal (e.g., a returned signal), delayed by the round-trip time to the target and back, generates signals at the receiver with frequencies that are proportional to the distance to each target in the field of view of the system. An up sweep of frequency and a down sweep of frequency may be used to detect a range and velocity of a detected target. However, when one or more of the LIDAR system and a target (or multiple targets) are moving, the issue of associating the peaks corresponding to each target arises.

SUMMARY

The present disclosure describes examples of systems and methods for ghost mitigation in coherent LIDAR systems using multiple frequencies.

According to one aspect, the present disclosure relates to a method. The method includes transmitting, toward a target in a field of view of a light detection and ranging (LIDAR) system, one or more optical beams comprising at least two up-chirp signals and at least two down-chirp signals. The method also includes receiving, from the target, a set of returned signals based on the one or more optical beams, wherein the set of returned signals includes at least two adjusted up-chirp signals shifted from the at least two up-chirp signals caused by a relative motion of at least one of the target and the LIDAR system, and at least two down-chirp signals shifted from the at least two down-chirp signals caused by the relative motion of at least one of the target and the LIDAR system. The at least two adjusted up-chirp signals and the at least two adjusted down-chirp signals producing a first set of peaks associated with the at least two up-chirp signals corresponding to a target location of the target and a second set of peaks associated with the at least two down-chirp signals corresponding to the target location. The method further includes determining whether to select a subset of peaks in the first set of peaks and the second set of peaks or each peak in the first set of peaks and the second set of peaks to calculate one or more of a location, a velocity, and a reflectivity related to the target. Provided each peak in first set of peaks and the second set of peaks include an SNR value exceeding a threshold value, the method further includes calculating the one or more of the location, the velocity, and the reflectivity based on each peak in first set of peaks and the second set of peaks. Provided at least one peak in the first set of peaks and the second set of peaks include an SNR value that is less than the threshold value, the method further includes calculating the one or more of the location, the velocity, and the reflectivity based on the subset of peaks.

In one embodiment, the one or more optical beams are transmitted by a single optical source.

In one embodiment, the one or more optical beams are transmitted by at least two optical sources.

In one embodiment, the one or more optical beams are transmitted over one or more of multiple sweeps, multiple lines, and multiple frames.

In one embodiment, the first set of peaks includes a first peak and a second peak, wherein the first and second peak include SNR values exceeding the threshold value and the second set of peaks includes a third peak and a fourth peak, wherein the third and fourth peak include SNR values exceeding the threshold value. Calculating one or more of the location, the velocity, and the reflectivity based on each peak in first set of peaks and the second set of peaks includes determining one or more of the target location, the target velocity, and the target reflectivity based on the first peak, the second peak, the third peak, and the fourth peak, and calculating one or more of the target location, the target velocity, and the target reflectivity based on the subset of the peaks s includes: determining one or more of the target location, the target velocity, and the target reflectivity based on the first peak and the third peak.

In one embodiment, the first set of peaks includes a first peak and a second peak, wherein the first and second peak include SNR values exceeding the threshold value and the second set of peaks includes a third peak and a fourth peak, wherein the third and fourth peak include SNR values exceeding the threshold value. Calculating the one or more of the target location, a target velocity, and a target reflectivity using the first set of peaks and the second set of peaks includes calculating the one or more of the target location, a target velocity, and a target reflectivity based on the first set of peaks, and confirming the one or more of the target location, a target velocity, and a target reflectivity based on the second set of peaks.

In one embodiment, the first set of peaks includes a first peak and a second peak, the second set of peaks includes a third peak and a group of peaks, and the group of peaks includes a fourth peak.

In one embodiment, the first set of peaks includes a first peak and a second peak and the second set of peaks includes a third peak. The method further includes determining a fourth peak based on the first peak, the second peak, and the third peak.

In one embodiment, determining the target location includes selecting the fourth peak from the group of peaks and determining the target location based on the first peak, the second peak, the third peak, and the fourth peak.

In one embodiment, selecting the fourth peak from the group of peaks includes determining an estimated peak based on the first peak and the third peak and selecting the fourth peak based on the estimated peak.

In one embodiment, selecting the fourth peak from the group of peaks includes determining a first range based on the first peak and the second peak, determining a set of ranges to the target based on the first peak, the second peak, the third peak, and the group of peaks, and selecting the fourth peak from the group of peaks based on a minimum difference between the first range and the set of ranges.

In one embodiment, selecting the fourth peak from the group of peaks includes determining a first of Doppler shift to the target based on the first peak and the second peak, determining a set of Doppler shifts based on the third peak, and the group of peaks, and selecting the fourth peak from the group of peaks based on a minimum difference between the first Doppler shift and the set of Doppler shifts.

In one embodiment, the at least two adjusted up-chirp signals and the at least two adjusted down-chirp signals further produce a third set of peaks associated with the at least two up-chirp signals corresponding to a second target location of a second target and a fourth set of peaks associated with the at least two down-chirp signals corresponding to the second target location. The method further includes determining the second target location using the third set of peaks and the fourth set of peaks.

According one aspect, the present disclosure relates to a light detection and ranging (LIDAR) system. The LIDAR system includes a processor and a memory to store instructions that, when executed by the processor, cause the LIDAR system to: transmit, toward a target in a field of view of the LIDAR system, one or more optical beams comprising at least two up-chirp signals and at least two down-chirp signals; receive, from the target, a set of returned signals based on the one or more optical beams, wherein the a set of returned signals includes at least two adjusted up-chirp signals shifted from the at least two up-chirp signals caused by a relative motion of at least one of the target and the LIDAR system, and at least two down-chirp signals shifted from the at least two down-chirp signals caused by the relative motion of at least one of the target and the LIDAR system, the at least two adjusted up-chirp signals and the at least two adjusted down-chirp signals producing a first set of peaks associated with the at least two up-chirp signals corresponding to a target location of the target and a second set of peaks associated with the at least two down-chirp signals corresponding to the target location; determine whether to select a subset of peaks in the first set of peaks and the second set of peaks or each peak in the first set of peaks and the second set of peaks to calculate one or more of a location, a velocity, and a reflectivity related to the target; provided each peak in first set of peaks and the second set of peaks include an SNR value exceeding a threshold value, calculate the one or more of the location, the velocity, and the reflectivity based on each peak in first set of peaks and the second set of peaks; and provided at least one peak in the first set of peaks and the second set of peaks include an SNR value that is less than the threshold value, calculate the one or more of the location, the velocity, and the reflectivity based on the subset of peaks.

In one embodiment, the first set of peaks includes a first peak and a second peak, the second set of peaks includes a third peak and a group of peaks, and the group of peaks includes a fourth peak.

In one embodiment, to determine the target location the processor is further to select the fourth peak from the group of peaks determine the target location based on the first peak, the second peak, the third peak, and the fourth peak.

In one embodiment, to select the fourth peak from the group of peaks the processor is further to determine an estimated peak based on the first peak and the third peak and select the fourth peak based on the estimated peak.

In one embodiment, to select the fourth peak from the group of peaks the processor is further to determine a first range based on the first peak and the second peak, determine a set of ranges to the target based on the first peak, the second peak, the third peak, and the group of peaks, and select the fourth peak from the group of peaks based on a minimum difference between the first range and the set of ranges.

In one embodiment, to select the fourth peak from the group of peaks the processor is further to determine a first of Doppler shift to the target based on the first peak and the second peak, determine a set of Doppler shifts based on the third peak, and the group of peaks, select the fourth peak from the group of peaks based on a minimum difference between the first Doppler shift and the set of Doppler shifts.

According one aspect, the present disclosure relates to a light detection and ranging (LIDAR) system. The LIDAR system includes a an optical scanner to transmit one or more optical beams comprising at least two up-chirp signals and at least two down-chirp signals toward a target in a field of view of the LIDAR system and receive a set of returned signals based on the one or more optical beams wherein the a set of returned signals comprises at least two adjusted up-chirp signals shifted from the at least two up-chirp signals caused by a relative motion of at least one of the target and the LIDAR system, and at least two down-chirp signals shifted from the at least two down-chirp signals caused by the relative motion of at least one of the target and the LIDAR system, the at least two adjusted up-chirp signals and the at least two adjusted down-chirp signals producing a first set of peaks associated with the at least two up-chirp signals corresponding to a target location of the target and a second set of peaks associated with the at least two down-chirp signals corresponding to the target location. The optical processing system is coupled to the optical scanner to generate a baseband signal in a time domain from the return signal, the baseband signal comprising frequencies corresponding to LIDAR target ranges. A signal processing system coupled to the optical processing system, comprising a processing device and a memory to store instructions that, when executed by the processing device, cause the LIDAR system to: determine whether to select a subset of peaks in the first set of peaks and the second set of peaks or each peak in the first set of peaks and the second set of peaks to calculate one or more of a location, a velocity, and a reflectivity related to the target; provided each peak in first set of peaks and the second set of peaks comprise an SNR value exceeding a threshold value, calculate the one or more of the location, the velocity, and the reflectivity based on each peak in first set of peaks and the second set of peaks; and provided at least one peak in the first set of peaks and the second set of peaks comprise an SNR value that is less than the threshold value, calculate the one or more of the location, the velocity, and the reflectivity based on the subset of peaks.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for automatically mitigating ghosting that may occur due to Doppler shifts. According to some embodiments, the described LIDAR system may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

LIDAR systems described by the embodiments herein include coherent scan technology to detect a signal returned from a target to generate a coherent heterodyne signal, from which range and velocity information of the target may be extracted. A signal, or multiple signals, may include an up-sweep of frequency (up-chirp) and a down-sweep of frequency (down-chirp), either from a single optical source or from separate optical source (i.e., one source with an up-sweep and one source with a down-sweep). Accordingly, two different frequency peaks, one for the up-chirp and one for the down-chirp, may be associated with a target and can be used to determine target range and velocity. However, peak images may also occur when the LIDAR system processes the signals. Peak images may include data (e.g., graphical data) that includes signal attributes (e.g., SNR value) that suggests a weak correspondence between a detected peak and the location and/or speed of a target. Hence, if these peak images are used to detect a target, this may cause the LIDAR system will use faulty data to process location, speed, velocity related to the target. Use of peak images in this fashion may be referred to as ghosting. Using the techniques described herein, embodiments of the present invention can, among other things, address the issues described above by introducing phase modulations into the sweeps/chirps. This allows the LIDAR system to match the peaks and/or peak images with an expected peak shape to differentiate between the peaks (e.g., true peaks) and peak images. In contrast to image peaks, true peaks include data (e.g., graphical data) that includes signal attributes (e.g., a SNR value) that strongly corresponds to the location and/or speed of a target. Hence, such peaks enable LIDAR systems to reliably identify locations, speeds, velocities of a target. It should be noted that peak image may also be referred to as an image peak.

Figure 1:
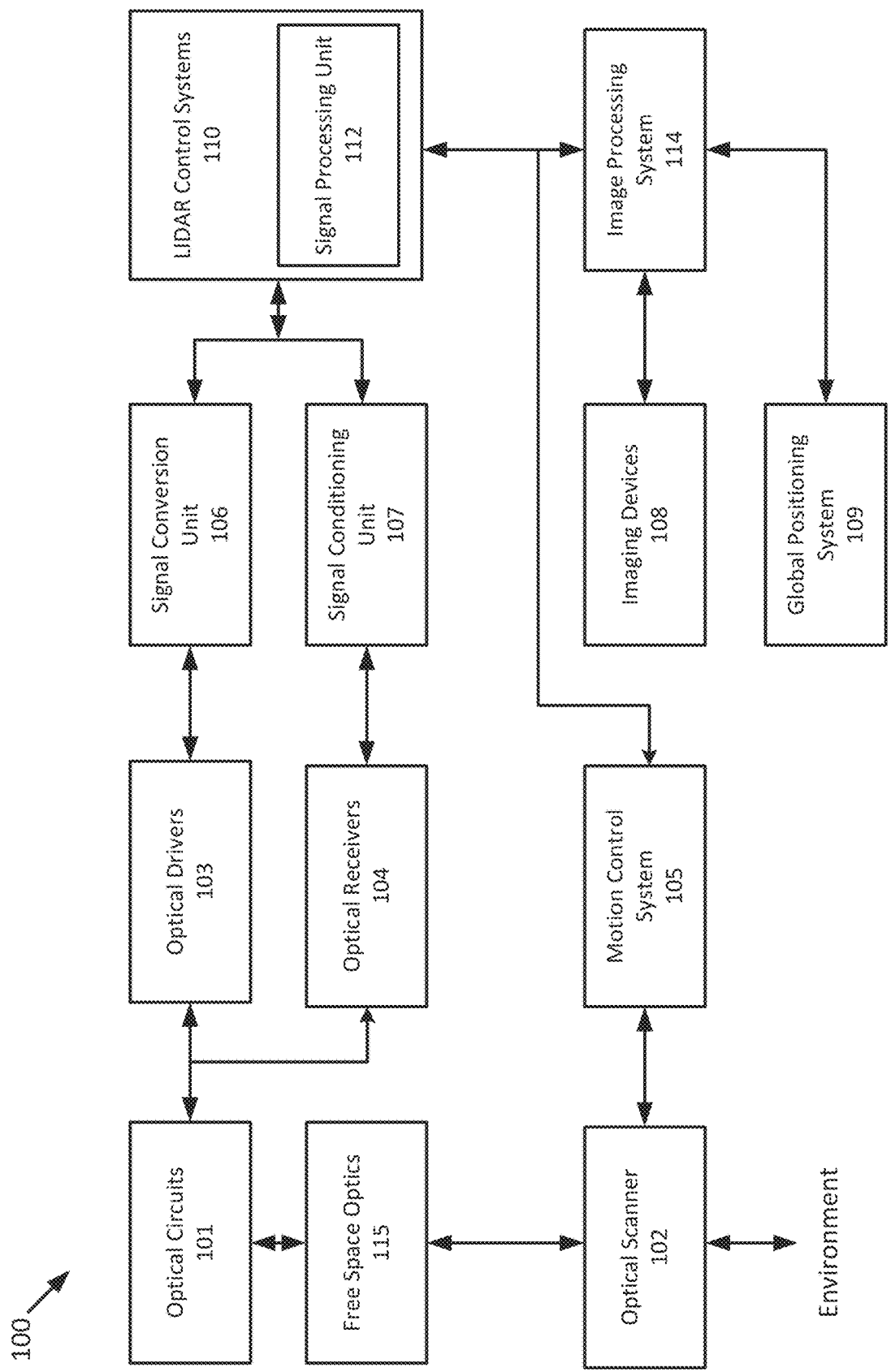
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical components include optical beams at different wavelengths, and include one or more optical amplifiers, one or more optical detectors, or the like.

Free space optics 115 may include one or more optical waveguides to carry optical signals, and route and manipulate optical signals to appropriate input/output ports of the active optical components. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis). Although a PBS may be referred to in some embodiments, embodiments of the present disclosure are not limited as such, and may include a circulator, directional couple, MMI, biastatic receiver, or similar component.

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a polarization wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In some examples, the LIDAR control systems 110 may include memory to store data, and instructions to be executed by the processing device. The memory may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such hard disk drives (HDD), optical disk memory such as compact-disk read-only (CD-ROM) and compact disk read-write memory (CD-RW), or any other type of non-transitory memory.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
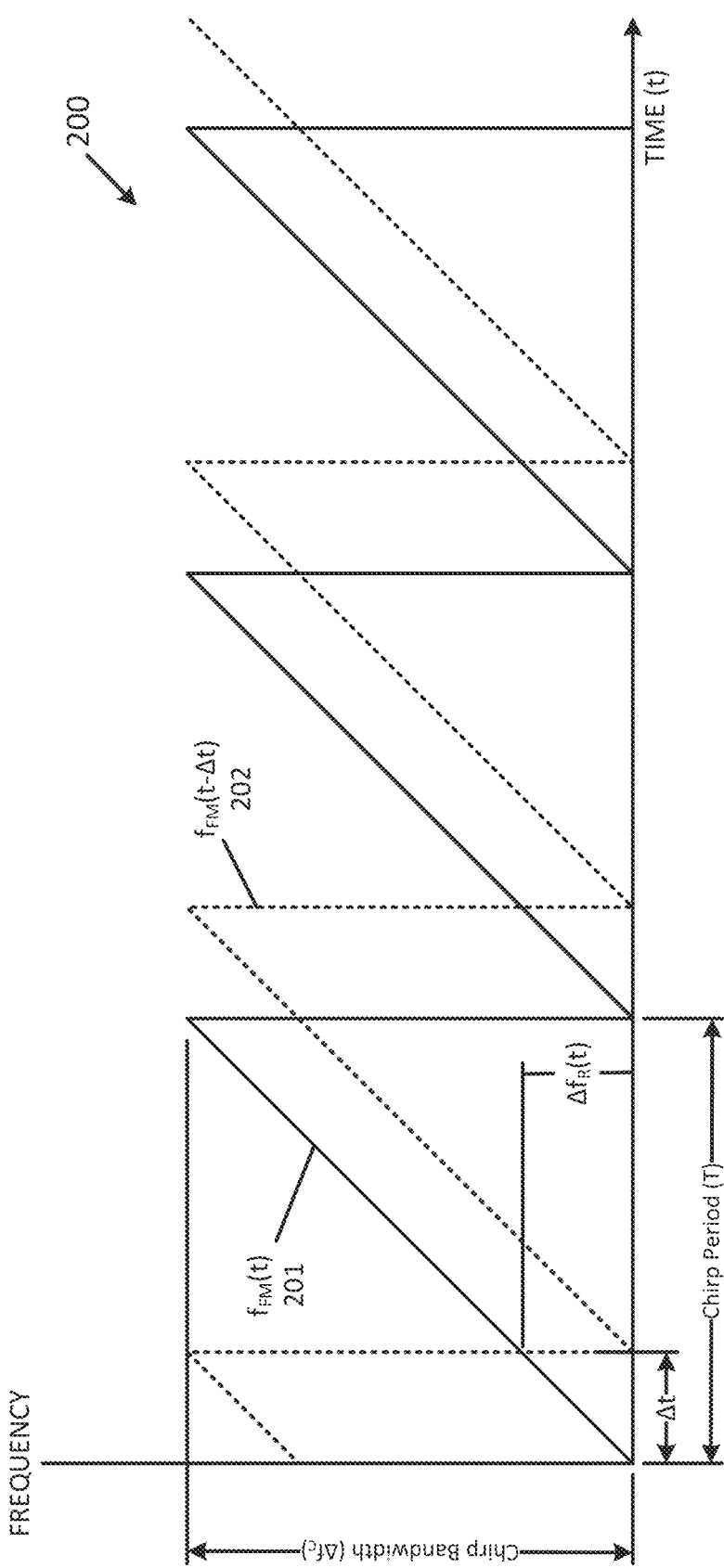
FIG. 2 is a time-frequency diagram illustrating one example of LIDAR waveforms according to the present disclosure.

FIG. 2 is a time-frequency diagram 200 of an scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp")

with a chirp bandwidth $\Delta f_C$ and a chirp period $T_C$. The slope of the sawtooth is given as $k=(\Delta f_C/T_C)$. FIG. 2 also depicts target return signal 202 (e.g., a returned signal) according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
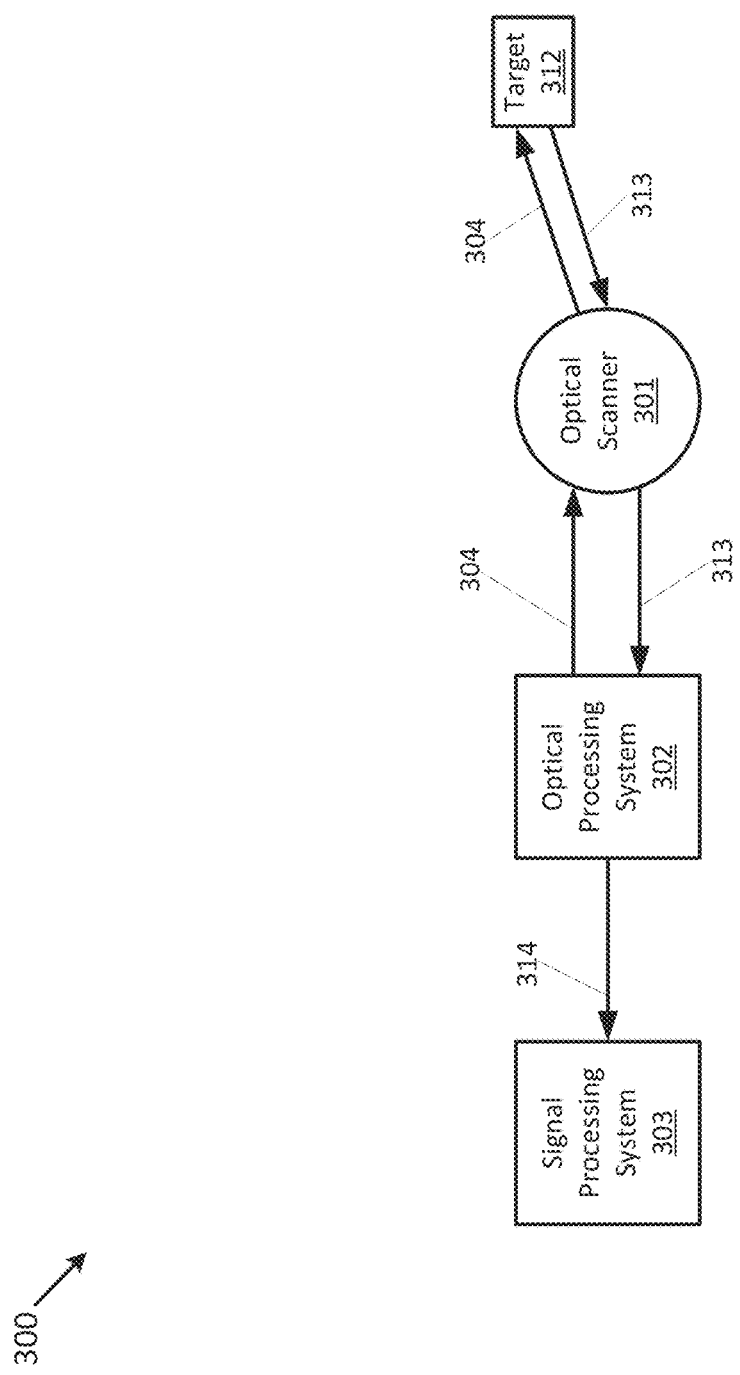
FIG. 3A is a block diagram illustrating an example LIDAR system according to the present disclosure.

FIG. 3A is a block diagram illustrating an example LIDAR system 300 according to the present disclosure. Example system 300 includes an optical scanner 301 to transmit an frequency-modulated continuous wave infrared (IR) optical beam 304 and to receive a return signal 313 from reflections of the optical beam 304 from targets such as target 312 in the field of view (FOV) of the optical scanner 301. System 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
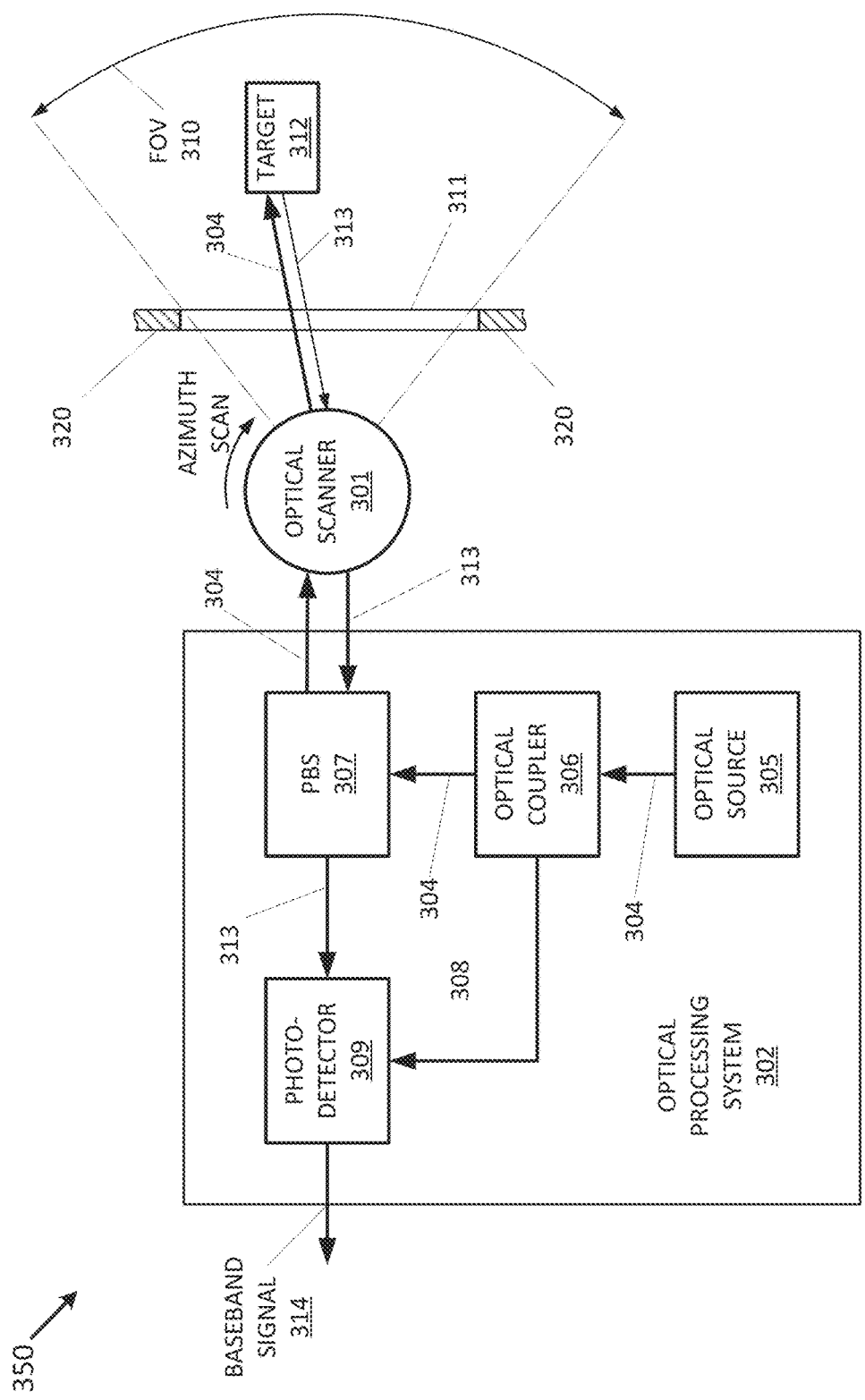
FIG. 3B is a block diagram illustrating an electro-optical optical system according to the present disclosure.

FIG. 3B is a block diagram illustrating an example electro-optical system 350. Electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the optical beam 304 (e.g., a FMCW optical beam). The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR window 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a range-dependent baseband signal 314 in the time domain. The range-dependent baseband signal 314 is the frequency difference between the local sample 308 of the optical beam 304 and the return signal 313 versus time (i.e., $\Delta f_R(t)$). The range-dependent baseband signal 314 may be in a frequency domain and may be generated by mixing at least one up-chirp signal and at least one down-chirp signal with the return signal 313. The at least one down-chirp signal may be delayed in time proportional to the relative motion of at least one of the target and the LIDAR system.

Figure 4:
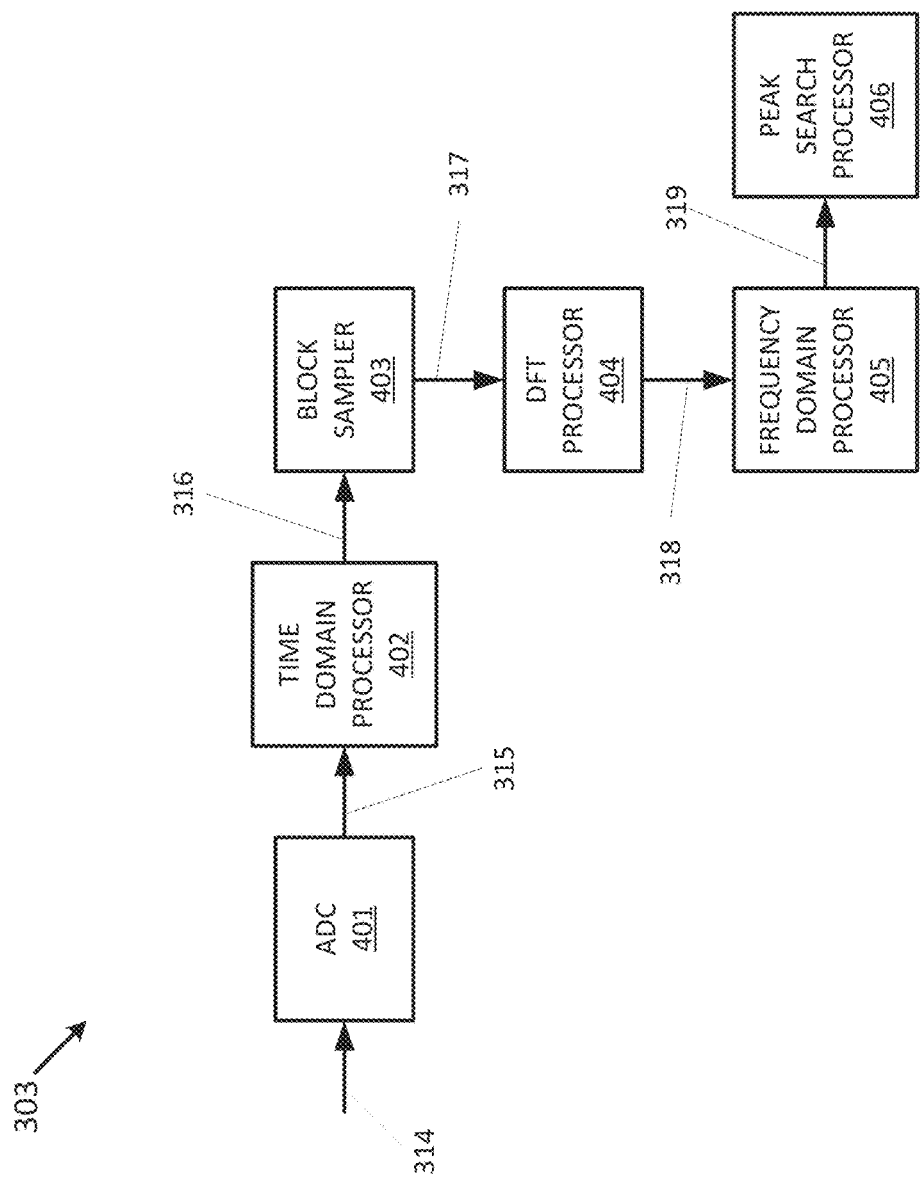
FIG. 4 is a block diagram of an example signal processing system according to the present disclosure.

FIG. 4 is a detailed block diagram illustrating an example of the signal processing system 303, which processes the baseband signal 314 according to some embodiments. As noted above, signal processing unit 303 may include elements of signal conversion unit 106, signal conditioning unit 107, LIDAR control systems 110 and signal processing unit 112 in LIDAR system 100.

Signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband signal 314, which is a continuous analog signal in the time domain, is sampled by ADC 401 to generate a series of time domain samples 315. The time domain samples 315 are processed by the time domain processor 402, which conditions the time domain samples 315 for further processing. For example, time domain processor 402 may apply weighting or filtering to remove unwanted signal artifacts or to render the signal more tractable for subsequent processing. The output 316 of time domain processor 402 is provided to block sampler 403. Block sampler 403 groups the time domain samples 316 into groups of N samples 317 (where N is an integer greater than 1), which are provided to DFT processor 404. DFT processor 404 transforms the groups of N time domain samples 317 into N frequency bins or subbands 318 in the frequency domain, covering the bandwidth of the baseband signal 314. The N subbands 319 are provided to frequency domain processor 405, which conditions the subbands for further processing. For example, frequency domain processor 405 may resample and/or average the subbands 319 for noise reduction. Frequency domain processor 405 may also calculate signal statistics and system noise statistics. The processed subbands 319 are then provided to a peak search processor 406 that searches for signal peaks representing detected targets in the FOV of the LIDAR system 300.

Figure 5A:
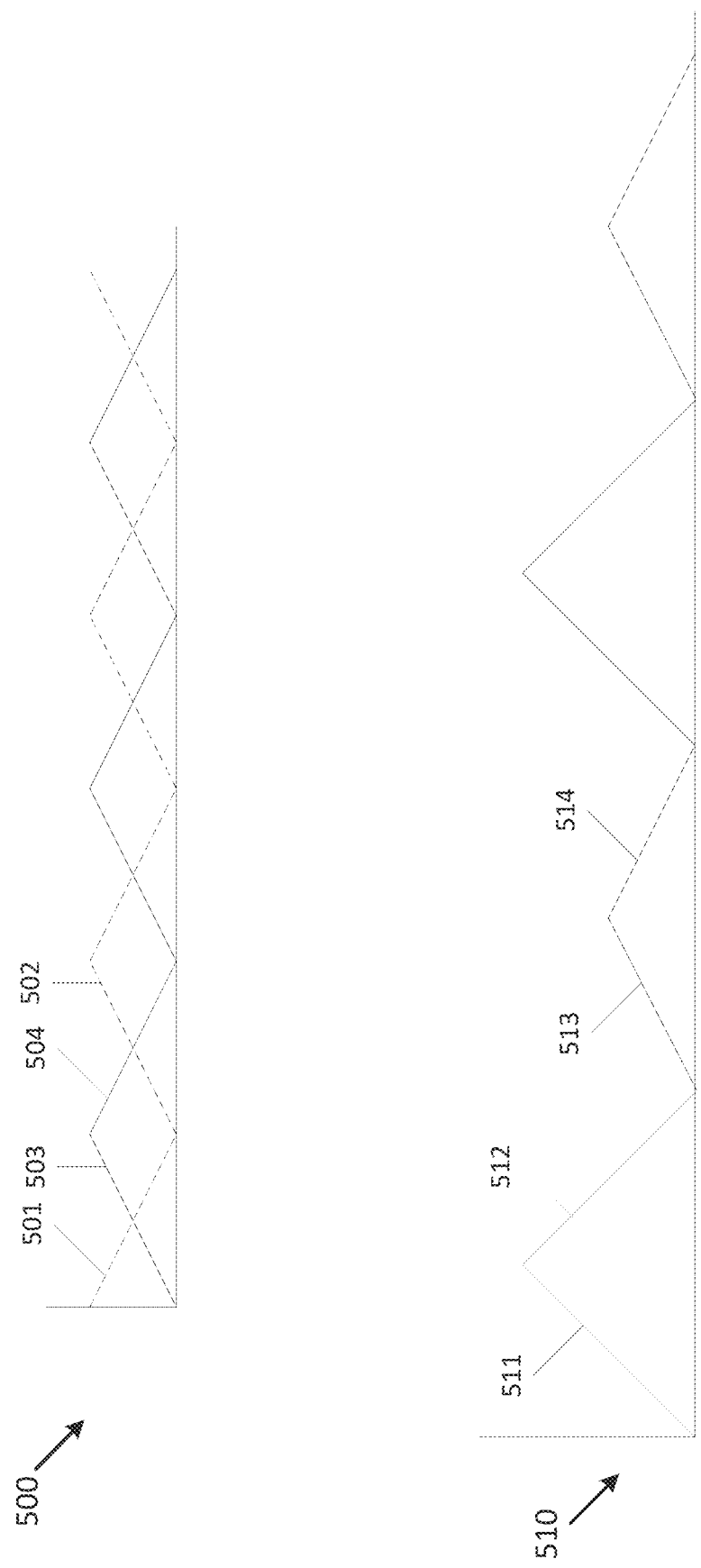
FIG. 5A is illustrates different time-frequency diagrams of scanning signals according to the present disclosure.

FIG. 5A illustrates different time-frequency diagrams of scanning signals that can be used by a LIDAR system, such as system 100, to scan a target environment according to some embodiments.

Time-frequency diagram 500 includes signals 501, 502, 503, and 504. scanning signals 501 and 504 may be referred to as down-chirps, down -sweeps, etc., because the frequency of the scanning signals 501 and 504 decrease over time. scanning signals 503 and 502 may be referred to as up-chirps, up-sweeps, etc., because the frequency of the scanning signals 503 and 502 increase over time. As illustrated in time-frequency diagram 5A, a down-chirp (e.g., scanning signal 501) is transmitted at the same time as an up-chirp (e.g., scanning signal 503). The chirp rate for signals 511, 512, 513, and 514 may be the same.

Multiple optical sources may be used to transmit the scanning signals (e.g., various types of scanning signals including, but not limited to, frequency modulated continuous wave (FMCW) and the like). For example, a first optical source may transmit the signal 501 and 502 and a second optical source may transmit the signal 503 and 504.

Time-frequency diagram 510 includes signals 511, 512, 513, and 514. scanning signals 512 and 514 may be referred to as down-chirps, down -sweeps, etc., because the frequency of the scanning signals 512 and 514 decrease over time. scanning signals 513 and 511 may be referred to as up-chirps, up-sweeps, etc., because the frequency of the scanning signals 513 and 511 increase over time. The chirp rate for signals 511 and 512 may be different than the chirp rate for signals 513 and 514.

One or more optical sources may be used to transmit the scanning signals. For example, a first optical source may transmit the scanning signals 511 and 512 and a second optical source may transmit the scanning signals 513 and 514. In another example, the same optical source may transmit the scanning signals 511 through 514.

Figure 5B:
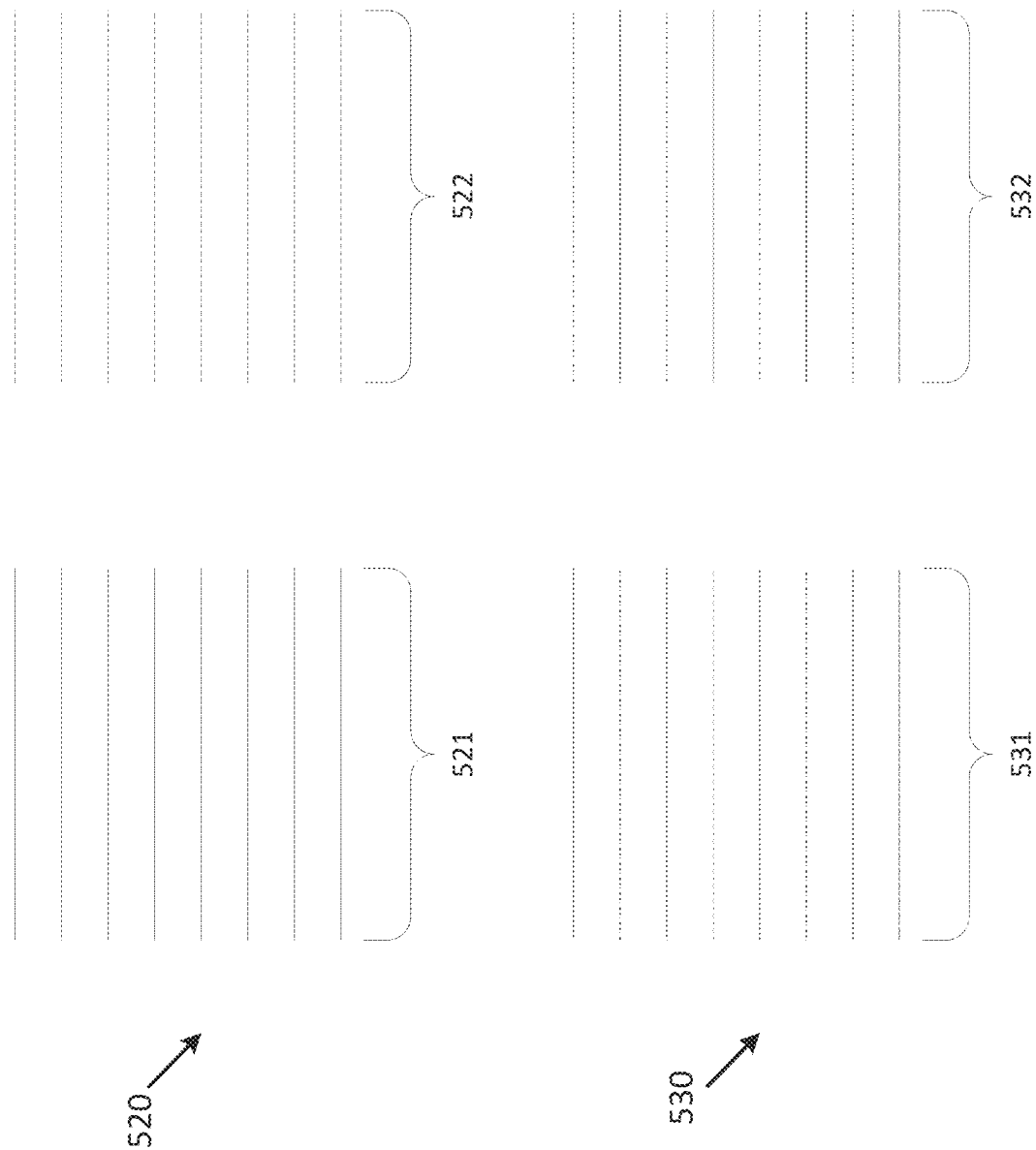
FIG. 5B illustrates different frequency diagrams of scanning signals according to the present disclosure.

FIG. 5B illustrates different frequency diagrams 520 and 522 of scanning signals that can be used by a LIDAR system, such as system 100, to scan a target environment according to some embodiments.

The frequency diagram 520 includes two frames 521 and 522. A frame may be a complete scan of the field of view of the LIDAR system. For example, a frame may be a square/rectangular area that represents the field of view of the LIDAR system. As illustrated in FIG. 5B, the frame 521 includes eight scan lines and the frame 522 includes eight scan lines. The scan lines in frame 521 may use an optical beam with a chirp-rate (as indicated by the solid lines). The scan lines in frame 522 may use an optical beam with a second (e.g., different) chip-rate (as indicated by the dashed lines). Multiple optical sources may be used to transmit the scan lines of frames 521 and 522. For example, one optical source may transmit an optical beam with the first chirp-rate and another optical source may transmit an optical beam with the second chirp-rate. A single optical source may also be used to transmit the scan lines of frames 521 and 522. For example, the optical source may transmit an optical beam with a first chirp-rate for the frame 521 and the optical source may transmit an optical beam with a second chirp-rate for the frame 522.

The frequency diagram 530 includes two frames 531 and 532. As discussed above, a frame may be a complete scan of the field of view of the LIDAR system. As illustrated in FIG. 5B, the frame 531 includes eight scan lines and the frame 532 includes eight scan lines. The scan lines in frame 531 may alternate between using an optical beam with a first chirp-rate (as indicated by the solid lines) and an optical beam with a second (e.g., different) chirp-rate (as indicated by the dashed lines). Multiple optical sources may be used to transmit the scan lines of frames 531 and 532. For example, one optical source may transmit an optical beam with the first chirp-rate and another optical source may transmit an optical beam with the second chirp-rate. A single optical source may also be used to transmit the scan lines of frames 531 and 532. For example, the optical source may alternate between transmitting an optical beam with a first chirp-rate and an optical beam with a second chirp-rate.

Although the present disclosure may refer to two chirp-rates (e.g., a first chirp-rate and a second chirp-rate), other embodiments may use a different number of chirp rates. For example, four chirp-rates, ten chirp-rates, hundreds of chirp-rates, or some other appropriate number of chirp-rates may be used in other embodiments.

Figure 6:
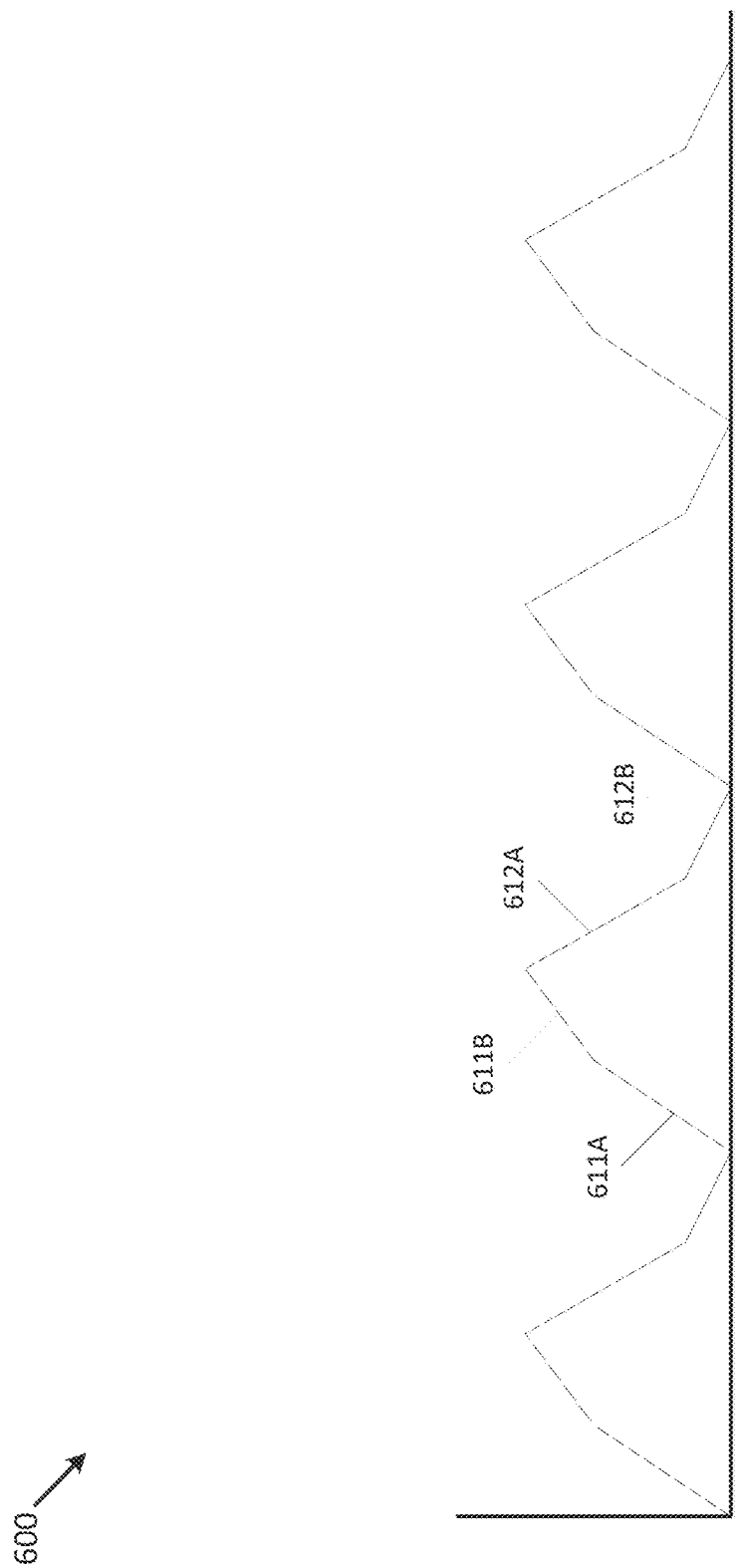
FIG. 6 is a time-frequency diagram illustrating one example of LIDAR waveforms according to the present disclosure.

FIG. 6 illustrates a time-frequency diagram of scanning signals that can be used by a LIDAR system, such as system 100, to scan a target environment according to some embodiments. Time-frequency diagram 600 includes scanning signals 611 and 612. scanning signal 612 may be referred to as a down-chirp, down-sweep, etc., because the frequency of the scanning signal 612 decreases over time. scanning signal 611 may be referred to as an up-chirp, up-sweep, etc., because the frequency of the scanning signals 613 and 611 increase over time. As illustrated in FIG. 6, scanning signal 611 may be divided into two portions 611A and 611B. The chirp rate for portion 611A is different for portion 611B. scanning signal 611 may also be divided into two portions 612A and 612B. The chirp rate for portion 612A is different for portion 612B.

Figure 7:
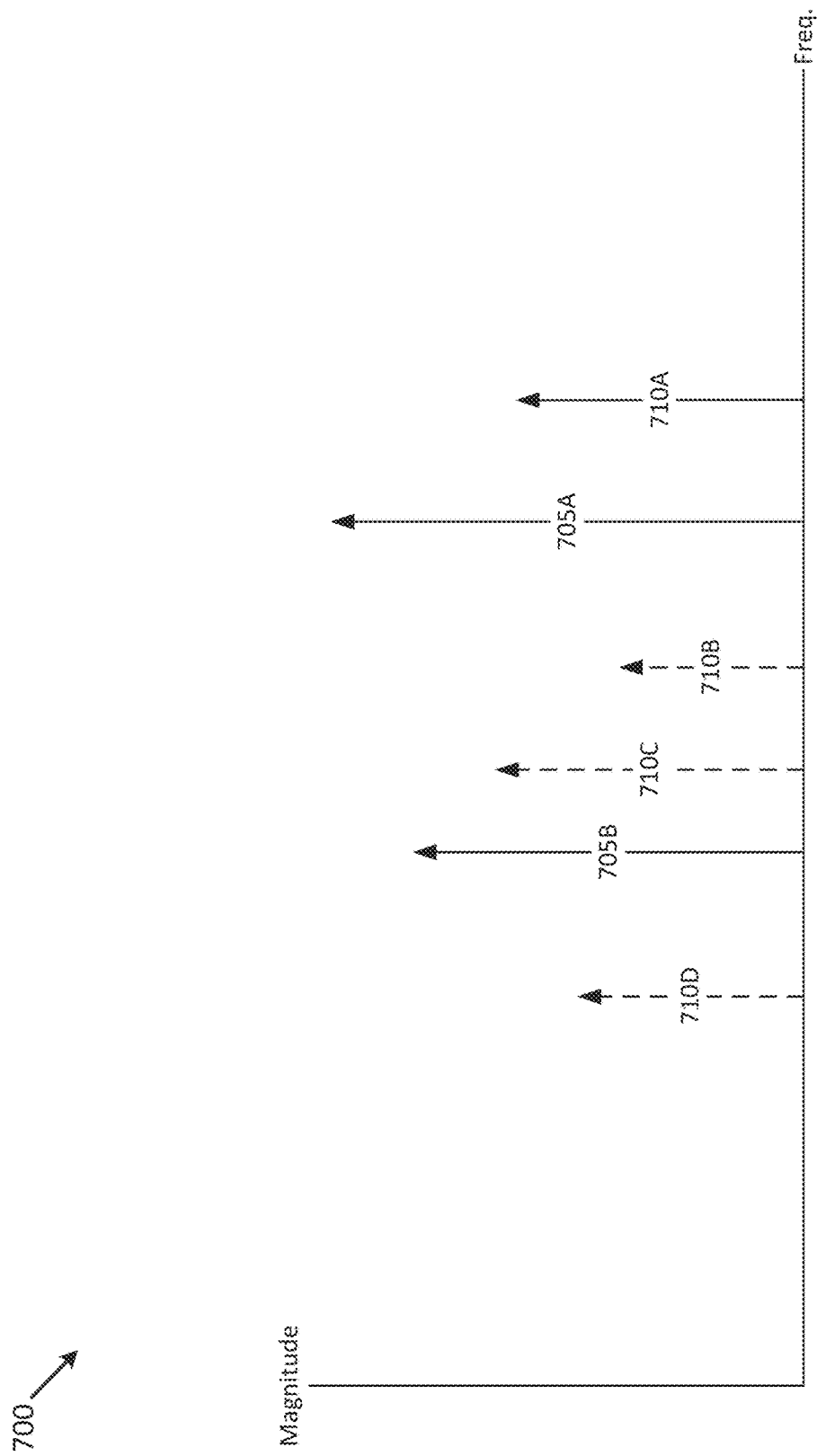
FIG. 7 is a signal magnitude-frequency diagram illustrating signal peaks for a target according to the present disclosure.

FIG. 7 is an example of a signal magnitude-frequency diagram 700 illustrating signal peaks according to some embodiments. A LIDAR system (e.g., a FMCW or other type of LIDAR system) may generate at least two up-chirp and at least 2 down-chirp signal modulations (also referred to herein as up-sweeps and down-sweeps) to scan an environment and to determine one or more of the range, reflectivity, and velocity of targets within that environment. In one example, a single optical source may generate both the up-chirps and the down-chirps. In another example, the system may include an optical source to generate a signal that includes the up-chirps and another optical source to generate a signal that includes the down-chirps. In a further example, the system may include one optical source for each of the up-chirp signals and each of the down-chirp signals.

Using the returned signal and corresponding generated beat frequencies (i.e., peak frequencies) from the up-chirps and down-chirps, a signal processing system can determine one or more of a range (e.g., a location, a distance between a target and the LIDAR system), a velocity of a target (e.g., a target velocity), and/or a reflectivity of the target (e.g., a target reflectivity). For instance, according to some embodiments, the signal processing unit 112 can be configured to determine the range of the target by calculating a distance from the LIDAR system 700 using multiple frequencies corresponding to respective peaks. As discussed above, the signal processing unit 112 may generate a baseband signal in a frequency domain by mixing at least two up-chirp signals and at least two down-chirp signals with the one or more returned signals. The at least two down-chirp signals may be delayed in time proportional to the relative motion of at least one of the target and the LIDAR system. The baseband signal may include the peaks 705A, 705B, 710A, 710B, 710C, and 710D, and may include additional peaks (not illustrated in FIG. 7). Peaks 705A and 710A may be up-chirps and the peaks 705B and 710B may be down-chirps. Peaks 705A and 705B may have (or may be associated with) a first chirp-rate and peaks 710A and 710B may have (or may be associated with) with a second (e.g., different) chirp-rate.

According to some embodiments, the signal processing unit 112 can be configured to determine the velocity, range, and/or reflectivity of the target using differences between the multiple frequencies corresponding to the peaks. However, as depicted in FIG. 7, there may arise situations in which false peaks are also present in the baseband signal. For example, false peaks may be present in the baseband signal due to various reasons, causes, and/or factors. This may cause the LIDAR system to detect false (or "fake") targets rather than desirable "true" targets or peaks. In one embodiment, a false peak may be a peak providing a signal-to-noise (SNR) value that weakly corresponds to the location and/or speed of a target. For example, a false peak may be a peak that has a SNR value below a threshold value. In another example, a false peak may include data (e.g., graphical data) that includes signal attributes (e.g., a SNR value) that suggests a weak correspondence between a detected peak and the location and/or speed of a target.

As discussed above, the signal magnitude-frequency diagram 700 includes peak 705A, peak 705B, peak 710A, peak 710B, peak 710C, and peak 710D. Peaks 705A, 705B, 710A, 710B, 710C, and 710D may be present in the baseband signal that is processed and/or analyzed by a signal processing unit of the LIDAR system (e.g., signal processing unit 112 illustrated in FIG. 1), as discussed in more detail below. The LIDAR system may determine that peaks 705A, 705B, and 710A are true peaks. For example, the LIDAR system may determine that peaks 705A, 705B, and 710A are true peaks based on a threshold height/magnitude of the peaks. In another example, the LIDAR system may use a confidence metric/level to determine that peaks 705A, 705B, and 710A are true peaks. In one embodiment, a true peak may be a peak providing an SNR value that strongly corresponds to the location and/or speed of a target. For example, a true peak may be a peak that has a SNR value greater than or equal to a threshold value. In another example, a true peak may include data (e.g., graphical data) that includes signal attributes (e.g., a SNR value) that strongly corresponds to the location and/or speed of a target. The LIDAR system may determine a first range (e.g., a first location, a first distance between the LIDAR system and the target) using peaks 705A and 705B. For example, the LIDAR system may determine that the range or distance to a target is proportional to the sum of the frequencies $F_{up}$ and $F_{dn}$. For example, the frequency proportional to the range of the target may be determined as follows: $(F_{up}+F_{dn})/2$, where $F_{up}$ is the frequency of peak 705A and $F_{dn}$ is the frequency of peak 705B.

In some scenarios, peak 705A is shifted (e.g., moved) upwards in frequency from the location of the target. Peak 705A may be referred to as an upshifted peak, as a Doppler shifted peak, or as $F_{1,up}$. Peak 705B is shifted downwards in frequency from the location of the target (as indicated by the solid vertical line in the signal magnitude-frequency diagram 700). Peak 705B may be referred to as a downshifted peak, as a Doppler shifted peak, or as $F_{1,dn}$. Peak 710A is shifted (e.g., moved) upwards in frequency from the location of the target. Peak 710A may be referred to as an upshifted peak, as a Doppler shifted peak, or as $F_{2,up}$.

The shift in the peaks may be due to the movement of one or more of the target and/or sensors from a LIDAR system (e.g., a FMCW or other type of LIDAR system). For example, the target may be moving, the device (e.g., a vehicle, a smartphone, etc.) that includes the LIDAR sensors (e.g., optical scanner 102 and/or optical circuits 101 illustrated in FIG. 1, etc.) may be moving, or both the target and the device may be moving relative to a particular point.

In some embodiments, the LIDAR system (e.g., signal processing unit 112 of LIDAR system 100 illustrated in FIG. 1) may select peak 705A as a true peak. For instance, when the target is at a closer range (e.g., within a first threshold range of the LIDAR), the peak with the highest frequency (e.g., peak 705A) may be determined to be a true peak corresponding to a target, rather than a peak image, and hence selected by the LIDAR system (e.g., signal processing unit 112 illustrated in FIG. 1). In this fashion, the signal processing unit 112 is configured to select peak 705A based on the type of ghosting that is occurring (e.g., close-range ghosting or far-range ghosting). Thus, the LIDAR (e.g., signal processing unit 112 illustrated in FIG. 1) may be able to determine that the peak 705A should be used when determining the range or distance to the target.

As discussed above, there may arise situations in which false peaks are present in the baseband signal. For example, due to hardware and computational resources, the beat signal may undergo real sampling and frequency peaks may be assumed to be positive. However, if the target is at a closer range (e.g., the peaks are within a lower frequency range or near lower frequencies), a Doppler shift can cause a beat frequency peak to become negative. In another example, there may be noise present in the baseband signal and the noise may cause a peak in the baseband signal. In a further example, there may be an image peak, as discussed in more detail below. As illustrated in FIG. 7, there are multiple peaks that may be candidates, possibilities, etc., for the downshifted peak that corresponds to peak 710A. For example, one of peaks 710B, 710C, and 710D may be the corresponding downshifted peak (e.g., a Doppler shifted peak, $F_{2,dn}$, etc.) for peak 710. Thus, the LIDAR system may determine which one of peaks 710B, 710C, and 710D is a true peak.

In one embodiment, the LIDAR system (e.g., the signal processing unit 112 illustrated in FIG. 1) may determine one or more of a range (e.g., location, distance between the LIDAR system and the target, etc.), velocity, and reflectivity using peak 710A and each of the peaks 710B, 710C, and 710D. For example, the LIDAR system may determine three ranges (e.g., a set of ranges) using 1) peaks 710A and 710B; 2) peaks 710A and 710C; and 3) peaks 710A and 710D. Each of the three ranges may be determined (e.g., calculated, obtained, generated, etc.) as follows: $(F_{up}+F_{dn})/2$, where $F_{up}$ is the frequency of peak 710A and $F_{dn}$ is the frequency of one of the peaks 710B, 710C, and 710D. The LIDAR system may select the peak that has the smallest difference in range when compared with the first range (determined using peaks 705A and 705B). For example, the LIDAR system may minimize the difference in ranges (e.g., range differences) as follows:

$$\min\left|\frac{f_{1,up}+f_{1,dn}}{2\alpha_1}-\frac{f_{2,up}+f_{2,dn}}{2\alpha_2}\right|,$$

where $\alpha_1$ is the chirp rate associated with a first peak (e.g., peaks 705A and/or 705B) and $\alpha_2$ is the chirp rate associated with the second peak (e.g., peaks 710A, 710B, and/or 710C). The LIDAR system may determine that using peak 710B minimizes the difference in ranges when compared with the first range and may determine that peak 710B is a true peak.

In one embodiment, the LIDAR system (e.g., the signal processing unit 112 illustrated in FIG. 1) may determine Doppler shift using peaks 705A, 705B, and using peak 710A and each of the peaks 710B, 710C, and 710D. For example, the LIDAR system may determine a first Doppler shift using peaks 705A and 705B. The LIDAR system may determine three additional Doppler shifts (e.g., a set of Doppler shifts) using 1) peaks 710A and 710B; 2) peaks 710A and 710C; and 3) peaks 710A and 710D. Each of the Doppler shifts is proportional to the difference between the upshift and the downshift. 710A is the upshifted peak and one of the peaks 710B, 710C, and 710D is the downshifted peak. The LIDAR system may select the peak that has the smallest difference in Doppler shifts when compared with the first Doppler shift (determined using peaks 705A and 705B). For example, the LIDAR system may minimize the difference in Doppler shifts as follows:

$$\min\left|\frac{f_{1,up}-f_{1,dn}}{2\lambda_1}-\frac{f_{2,up}-f_{2,dn}}{2\lambda_2}\right|,$$

where $\lambda_1$ is the frequency of the optical beam associated with the first peak and $\lambda_2$ is the frequency of the optical beam associated with the second peak. The LIDAR system may determine that using peak 710B minimizes the difference in Doppler shifts when compared with the first Doppler shift and may determine that peak 710B is a true peak.

In one embodiment, one or more of the distance/range, velocity, and reflectivity of the target may be determined using one set of peaks and confirmed or verified using another set of peaks. For example, the distance/range, velocity, and/or reflectivity of the target may be determined (e.g., calculated) using peaks 705A and 705B, and may be confirmed/verified using peaks 710A and 710B. In another example, the distance/range, velocity, and/or reflectivity of the target may be determined (e.g., calculated) using peaks 710A and 710B, and may be confirmed/verified using peaks 705A and 705B.

In one embodiment, the LIDAR system (e.g., LIDAR system 100 illustrated in FIG. 1) may perform Doppler matching based on the peaks 705A, 705B, and 710A. For example, the LIDAR system may be able to determine a Doppler shift based on peaks 705A and 705B. Based on the Doppler shift, the LIDAR system may be able to determine, calculate, identify, infer, etc., peak 710B. For example, Doppler shift between the up-chirps and down-chirps may not change for a target. Thus, the LIDAR system may be able to identify/determine peak 710B by matching the resulting Doppler shift with the first Doppler shift calculated using peaks 705A and 705B.

Figure 8:
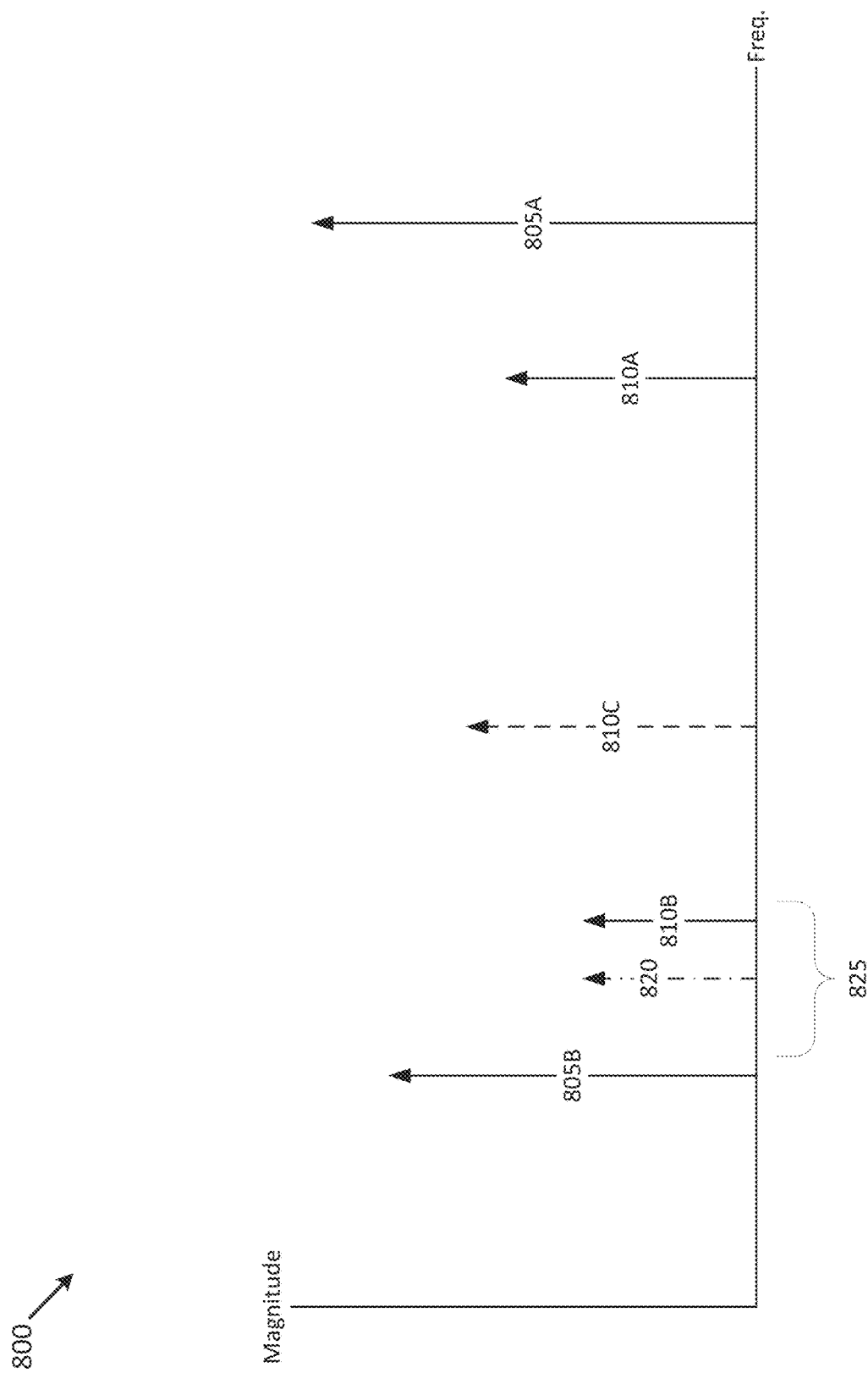
FIG. 8 is a signal magnitude-frequency diagram illustrating signal peaks for a target according to the present disclosure.

FIG. 8 is an example of a signal magnitude-frequency diagram 800 illustrating signal peaks for multiple targets according to some embodiments. As discussed above, a LIDAR system (e.g., LIDAR system 100 illustrated in FIG. 1) may generate at least two up-chirp and at least two down-chirp signal modulations to scan an environment and to determine range and velocity of targets within that environment. One or more optical sources may generate the up-chirps and the down-chirps. As described above, using the returned signal and corresponding generated beat frequencies (i.e., peak frequencies) from the up-chirps and down-chirps, a signal processing system (e.g., signal processing unit 112 illustrated in FIG. 1) can determine one or more of a range (e.g., a location, a distance between a target and the LIDAR system), a velocity of a target (e.g., a target velocity), and/or a reflectivity of the target (e.g., a target reflectivity.

As discussed above, the signal processing unit 112 may generate a baseband signal in a frequency domain by mixing at least two up-chirp signals and at least two down-chirp signals with the one or more returned signals. The at least two down-chirp signals may be delayed in time proportional to the relative motion of at least one of the target and the LIDAR system. The baseband signal may include the peaks 805A, 805B, 810A, 810B, and 810C, and may include additional peaks (not illustrated in FIG. 8). The peaks 805A and 810A may be up-chirps and the peaks 805B and 810B may be down-chirps. Peaks 805A and 805B may have (or may be associated with) a first chirp-rate and peaks 810A and 810B may have (or may be associated with) with a second (e.g., different) chirp-rate. The LIDAR system may determine that peaks 805A, 805B, and 810A are true peaks.

There may arise situations in which false peaks are present in the baseband signal, as discussed above. In particular, FIG. 8 may illustrate a situation where noise is present in the baseband signal and the noise may cause peak 810C in the baseband signal. The LIDAR system (e.g., may determine that peaks 805A, 805B, and 810A are true peaks based on a threshold height/magnitude of the peaks or by selecting the peaks with the largest heights/magnitude. Thus, peak 810C (e.g., a false peak) may be selected even though peak 810B is a true peak.

In one embodiment, the LIDAR system may determine that peak 810C is a false peak as follows:

$$\left|\left(\frac{(f_{1,up}+f_{1,dn})}{2\alpha_1}-\frac{(f_{2,up}+f_{2,dn,FA})}{2\alpha_2}\right)\right|>R_{MAXERR},$$

where $F_{1,up}$ is the frequency of peak 805A $F_{1,dn}$ is the frequency of peak 805B $F_{2,up}$ is the frequency of peak 810A, and $F2_{dn,FA}$ is the frequency of peak 810C. $R_{MAXERR}$ may be a maximum allowed range error (e.g., a threshold error). Because the result of the above-equation is greater than $R_{MAXERR}$ when the frequency of peak 810C is used, the LIDAR system (e.g., the signal processing unit 112 illustrated in FIG. 1) may determine that peak 810C is a false peak and may use peak 810B (e.g., the true peak) instead.

In another embodiment, the LIDAR system may determine, generate, calculate, etc., an estimate of the true peak associated with peak 810A (e.g., peak 810B). For example, based on peak 805A and 810A the LIDAR system (e.g., the signal processing unit 112 illustrated in FIG. 1) may generate an estimated peak 820. The estimated peak 820 may be determined as follows: $f_{2,\hat{d}n}=(2*\alpha_2+f_{1,up}+(-\alpha_1-\alpha_2)*f_{2,up})/(\alpha_1-\alpha_2)$, where $f_{1,up}$ is the frequency of peak 805A, $f_{2,up}$ is the frequency of peak 810A, $\alpha_1$ is the chirp rate associated with peak 805A and $\alpha_2$ is the chirp rate associated with peak 810A. The LIDAR system may determine that peak 810C is a false peak as follows: $|f_{2,\hat{d}n}-f_{2,dn,FA}|>f_{MAXERR}$, where $f_{MAXERR}$ is a maximum allowed frequency error, $f_{2,\hat{d}n}$ is frequency of the estimated peak and $f_{2,dn,FA}$ is the frequency of the peak 810C or the peak 810B. Because the result of the above-equation is greater than $f_{MAXERR}$ when the frequency of peak 810C is used, the LIDAR system (e.g., the signal processing unit 112 illustrated in FIG. 1) may determine that peak 810C is a false peak and may use peak 810B (e.g., the true peak) instead.

In one embodiment, the estimated peak 820 may be generated based on peak 805A, peak 805B, and peak 810A. The LIDAR system may use the estimated peak 820 as a true peak if peak 810B is not detected within the baseband signal. For example, peak 810B may be too weak (e.g., the magnitude/height of peak 810B may be too low). The LIDAR system may generate, calculate, etc., peak 820 based on peak 805A, peak 805B, and peak 810A and may use peak 820 to determine one or more of the target velocity, target range, and target reflectivity.

In one embodiment, the LIDAR system may also determine a range (e.g., a set, a bin, a group of frequencies) where the true peak associated with peak 810A (e.g., peak 810B) should be located. For example, the LIDAR system (e.g., the signal processing unit 112 illustrated in FIG. 1) may determine, calculate, generate, etc., the range 825 (e.g., a range of frequencies). The LIDAR system may select the peak that is located within the range 825 (e.g., peak 810B) as the true peak associated with peak 810A.

As discussed herein, various criteria, parameters, functions, and/or equations may be used to select a peak (e.g., select or identify a true peak) or determine (e.g., calculate, infer, etc.) a peak. For example, a peak may be selected or determined by minimizing a difference in Doppler shift. In another example, a peak may be selected or determined by minimizing a difference in range. In a further example, a peak may be selected by selecting peaks within particular frequency bands/ranges and/or avoiding peaks that are not within the particular frequency bands/ranges. In yet another example, a peak may be selected based on minimizing the difference between the selected peak and an estimated peak.

Figure 9:
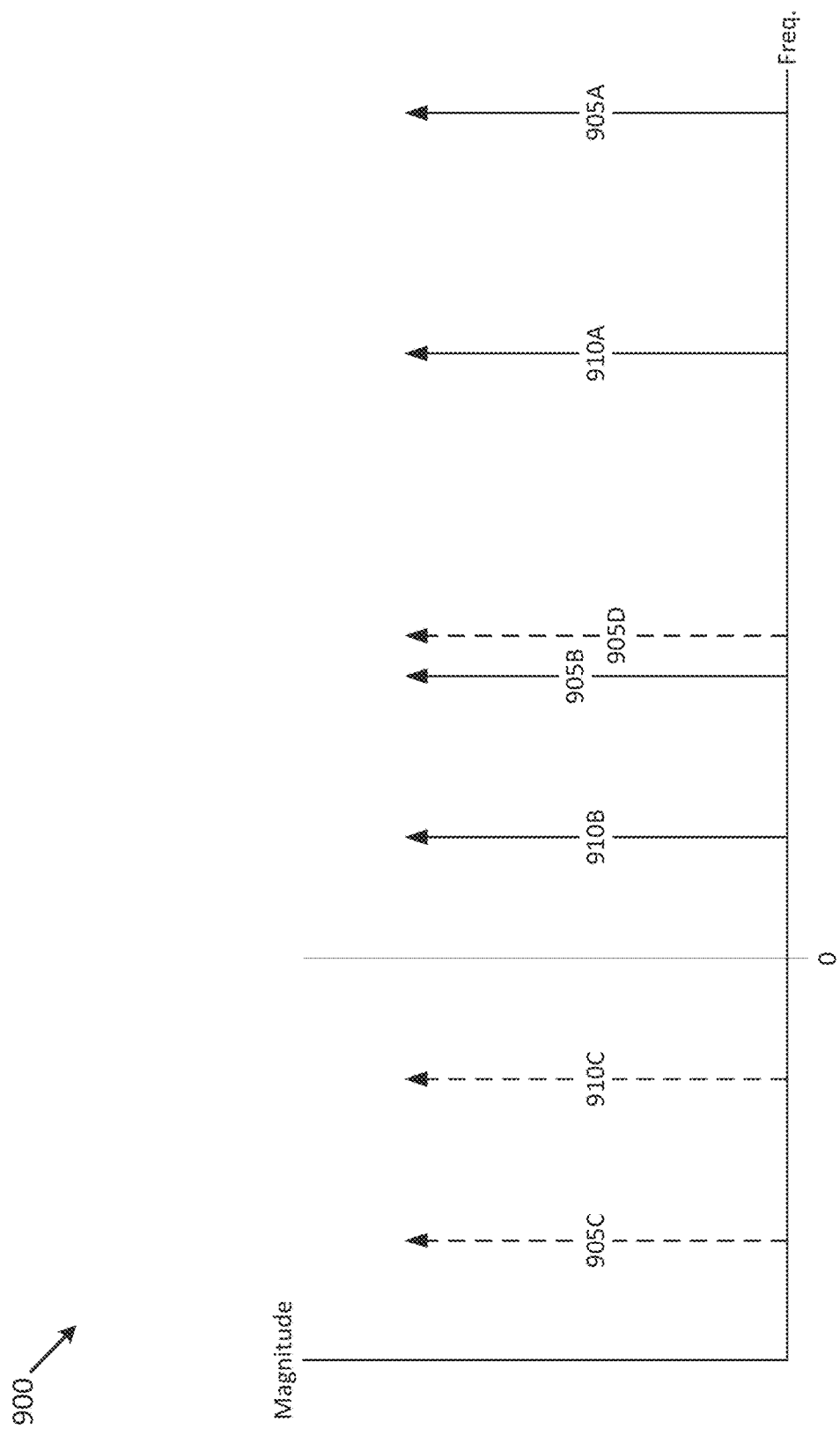
FIG. 9 is a signal magnitude-frequency diagram illustrating frequency ranges according to the present disclosure.

FIG. 9 is an example of a signal magnitude-frequency diagram 900 illustrating signal peaks for multiple targets according to some embodiments. As discussed above, a LIDAR system (e.g., LIDAR system 100 illustrated in FIG. 1) may generate at least two up-chirp and at least two down-chirp signal modulations to scan an environment and to determine range and velocity of targets within that environment. One or more optical sources may generate the up-chirps and the down-chirps. As described above, using the returned signal and corresponding generated beat frequencies (i.e., peak frequencies) from the up-chirps and down-chirps, a signal processing system (e.g., signal processing unit 112 illustrated in FIG. 1) can determine one or more of a range (e.g., a location, a distance between a target and the LIDAR system), a velocity of a target (e.g., a target velocity), and/or a reflectivity of the target (e.g., a target reflectivity).

As discussed above, the signal processing unit 112 may generate a baseband signal in a frequency domain by mixing at least two up-chirp signals and at least two down-chirp signals with the one or more returned signals. The at least two down-chirp signals may be delayed in time proportional to the relative motion of at least one of the target and the LIDAR system. The baseband signal may include the peaks 905A, 905B, 910A, 910B, and 910C, and may include additional peaks (not illustrated in FIG. 9). The peaks 905A and 910A may be up-chirps and the peaks 905B and 910B may be down-chirps. Peaks 905A and 905B may have (or may be associated with) a first chirp-rate and peaks 910A and 910B may have (or may be associated with) with a second (e.g., different) chirp-rate. The LIDAR system may determine that peaks 905A, 905B, and 910A are true peaks.

There may arise situations in which false peaks are present in the baseband signal, as discussed above. In particular, FIG. 9 may illustrate a situation where mirror images of peaks are in the baseband signal. Peak 905C may be a mirror image of peak 905B. For example, peak 905C is mirrored across the frequency 0 and shares the same properties of peak 905B. Peak 905C may be referred to as a false peak, a peak image, or an image peak. Peak 910C may be a mirror image of peak 910B. For example, peak 910C is mirrored across the frequency 0 and shares the same properties of peak 910B (e.g., same curvature or shape). Peak 910C may be referred to as a false peak, a peak image, or an image peak. The LIDAR system (e.g., may determine that peaks 905A and 910A are true peaks. Thus, the LIDAR system should determine which of peaks 905B, 905C, 910B, and 910C should be used.

In one embodiment, the LIDAR system (e.g., the signal processing unit 112 illustrated in FIG. 1) may determine which of the peaks 905B, 905C, 910B, and 910C are true peaks as follows:

$$\min\left|\frac{f_{1,up}\pm f_{1,dn}}{2\lambda_1}-\frac{f_{2,up}\pm f_{2,dn}}{2\lambda_2}\right|,$$

where $f_{1,up}$ is the frequency of peak 905A, $f_{2,up}$ is the frequency of peak 910A, $f_{1,dn}$ is the frequency of peak 905B or 905C, $f_{2,dn}$ is the frequency of peak 910B or 910C, $\lambda_1$ is the frequency of the optical beam for peak 905A, and $\lambda_2$ is the frequency of the optical beam for peak 910A. The LIDAR system may determine the true peaks for the down-chirps are the peaks which result in the minimum value for the above-equation.

In another embodiment, the LIDAR system (e.g., the signal processing unit 112 illustrated in FIG. 1) may determine, generate, calculate, etc., an estimate of the true peak associated with peak 905A (e.g., an estimate of peak 905B). For example, based on peak 905A and 910A the LIDAR system (e.g., the signal processing unit 112 illustrated in FIG. 1) may generate an estimated peak 905D, as discussed above. The LIDAR system may determine that peak 905C is a false peak as follows: $\min|f_{2,\hat{d}n}-f_{2,dn,H_N}|$, where $f_{2,\hat{d}n}$ is frequency of the estimated peak 905D and $f_{2,dn,HN}$ is the frequency of the peak 905B or the peak 905C. Because peak 905B will result in a minimum value for the above-equation, the LIDAR system may determine that peak 905B is a true peak.

Figure 10:
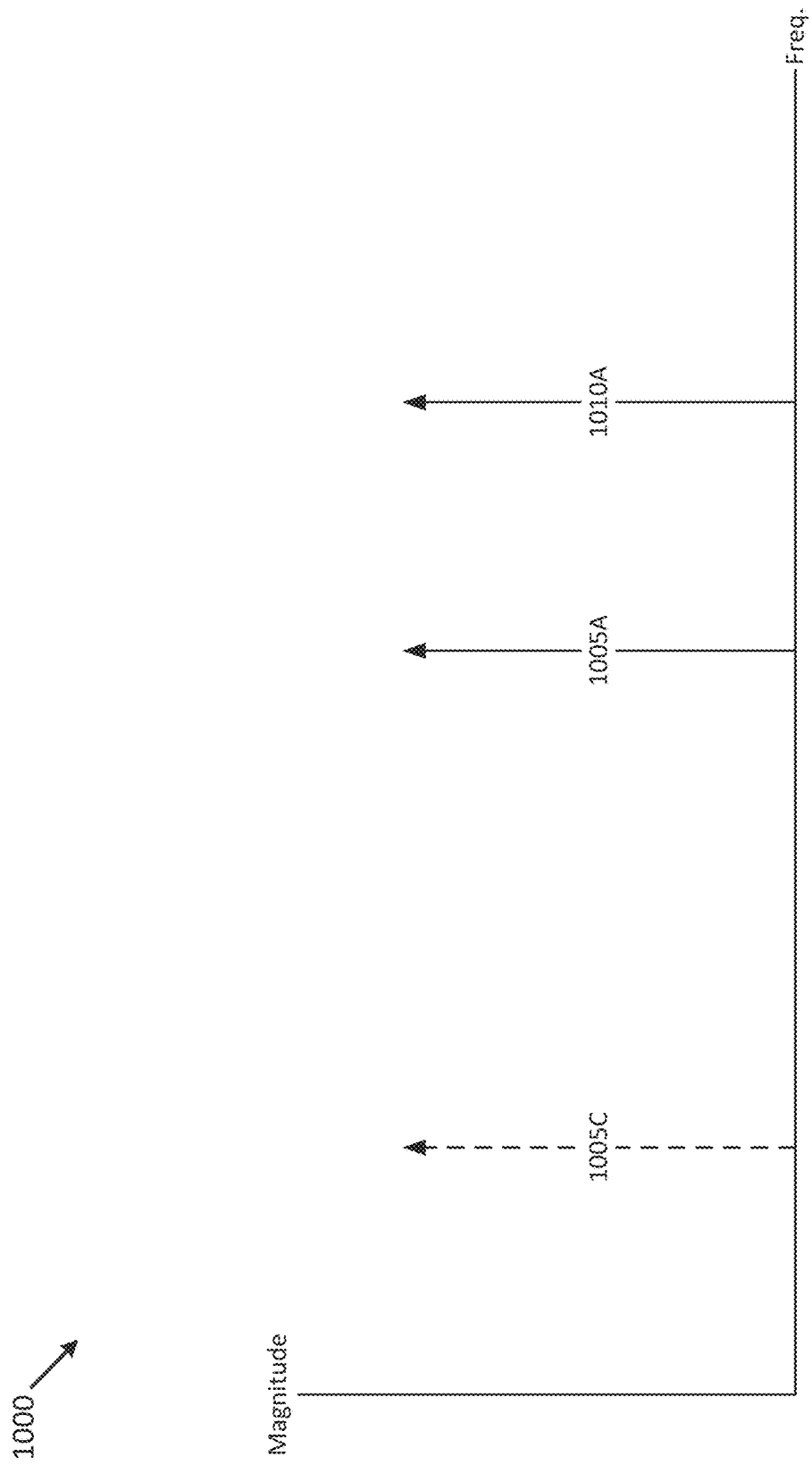
FIG. 10 is a signal magnitude-frequency diagram illustrating frequency ranges according to the present disclosure.

FIG. 10 is an example of a signal magnitude-frequency diagram 1000 illustrating signal peaks for multiple targets according to some embodiments. As discussed above, a LIDAR system (e.g., LIDAR system 100 illustrated in FIG. 1) may generate at least two up-chirp and at least two down-chirp signal modulations to scan an environment and to determine range and velocity of targets within that environment. One or more optical sources may generate the up-chirps and the down-chirps. As described above, using the returned signal and corresponding generated beat frequencies (i.e., peak frequencies) from the up-chirps and down-chirps, a signal processing system (e.g., signal processing unit 112 illustrated in FIG. 1) can determine one or more of a range (e.g., a location, a distance between a target and the LIDAR system), a velocity of a target (e.g., a target velocity), and/or a reflectivity of the target (e.g., a target reflectivity).

As discussed above, the signal processing unit 112 may generate a baseband signal in a frequency domain by mixing at least two up-chirp signals and at least two down-chirp signals with the one or more returned signals. The at least two down-chirp signals may be delayed in time proportional to the relative motion of at least one of the target and the LIDAR system. The baseband signal may include the peaks 1005A and 1010A. The peaks 1005A and 1010A may be up-chirps. Peaks 1005A and 1010A may have different chirp-rates.

In one embodiment, the LIDAR system (e.g., signal processing unit 112) may calculate, generate, determine, etc., an estimated peak 1005C (that corresponds to peak 1005A) as follows: $f_{2,\hat{d}n} = (2*\alpha_2 + f_{1,up} + (-\alpha_1 - \alpha_2)*f_{2,up})/(\alpha_1 - \alpha_2)$, where $f_{1,up}$ is the frequency of peak 1010A, $f_{2,up}$ is the frequency of peak 1005A, $\alpha_1$ is the chirp rate associated with peak 1010A and $\alpha_2$ is the chirp rate associated with peak 1005A. The above equation may be derived by combining the following equations:

$$f_{1,up} = \alpha_1 * R + f_D$$

$$f_{2,up} = \alpha_2 * R + f_D$$

$$R = (f_{1,up} - f_{2,up})/(\alpha_1 - \alpha_2)$$

$$f_D = f_1 - \alpha_1 * R,$$

where $f_{1,up}$ is the frequency of peak 1005A, $f_{2,up}$ is the frequency of peak 1010A, $\alpha_1$ is the chirp rate associated with peak 1005A and $\alpha_2$ is the chirp rate associated with peak 1010A, R is the range to the target, and $f_D$ is the Doppler frequency.

Figure 11:
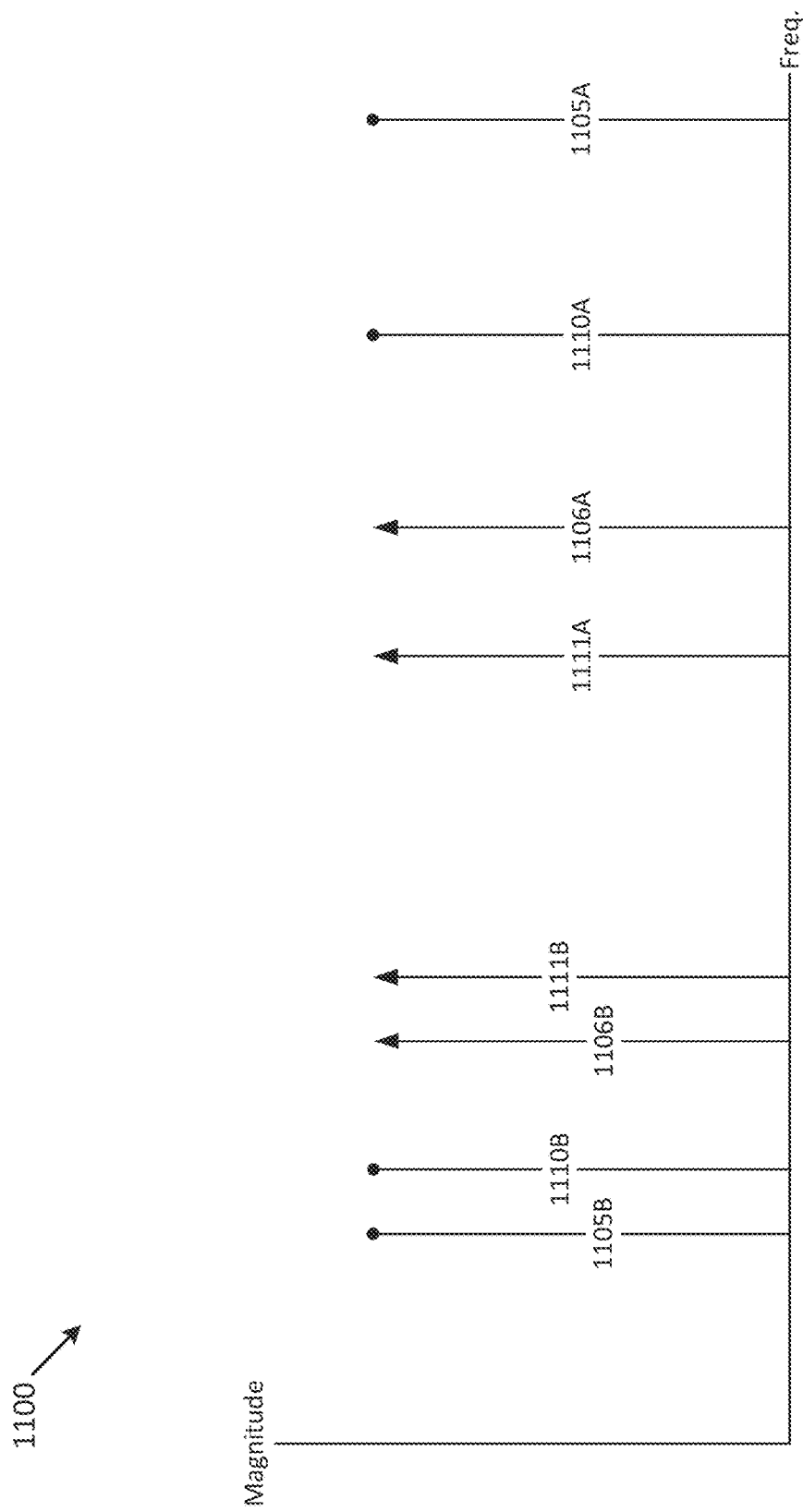
FIG. 11 is a signal magnitude-frequency diagram illustrating frequency ranges according to the present disclosure.

FIG. 11 is an example of a signal magnitude-frequency diagram 1000 illustrating signal peaks for multiple targets according to some embodiments. As discussed above, a LIDAR system (e.g., LIDAR system 100 illustrated in FIG. 1) may generate at least two up-chirp and at least two down-chirp signal modulations to scan an environment and to determine range and velocity of targets within that environment. One or more optical sources may generate the up-chirps and the down-chirps. As described above, using the returned signal and corresponding generated beat frequencies (i.e., peak frequencies) from the up-chirps and down-chirps, a signal processing system (e.g., signal processing unit 112 illustrated in FIG. 1) can determine one or more of a range (e.g., a location, a distance between a target and the LIDAR system), a velocity of a target (e.g., a target velocity), and/or a reflectivity of the target (e.g., a target reflectivity).

As discussed above, the signal processing unit 112 may generate a baseband signal in a frequency domain by mixing at least two up-chirp signals and at least two down-chirp signals with the one or more returned signals. The at least two down-chirp signals may be delayed in time proportional to the relative motion of at least one of the target and the LIDAR system. The baseband signal may include the peaks 1105A, 1110A, 1106A, 1111A, 1111B, 1106B, 1110B, and 1105B. The peaks 1105A, 1110A, 1106A, and 1111A may be up-chirps. The peaks 1111B, 1106B, 1110B, and 1105B may be down-chirps. Peaks 1105A and 1105B may have (or may be associated with) a first chirp-rate and peaks 1110A and 1110B may have (or may be associated with) with a second (e.g., different) chirp-rate.

In one embodiment, there may be multiple targets within range of the LIDAR system. Thus, each of the peaks 1105A, 1110A, 1106A, 1111A, 1111B, 1106B, 1110B, and 1105B may be true peaks. To determine which down-chirp peaks correspond to which up-chirp peaks, the LIDAR system (e.g., the signal processing unit 112 illustrated in FIG. 1) may generate, determine calculate, etc., estimated peaks based on the up-chirp peaks 1105A, 1110A, 1106A, and 1111A.

Figure 12:
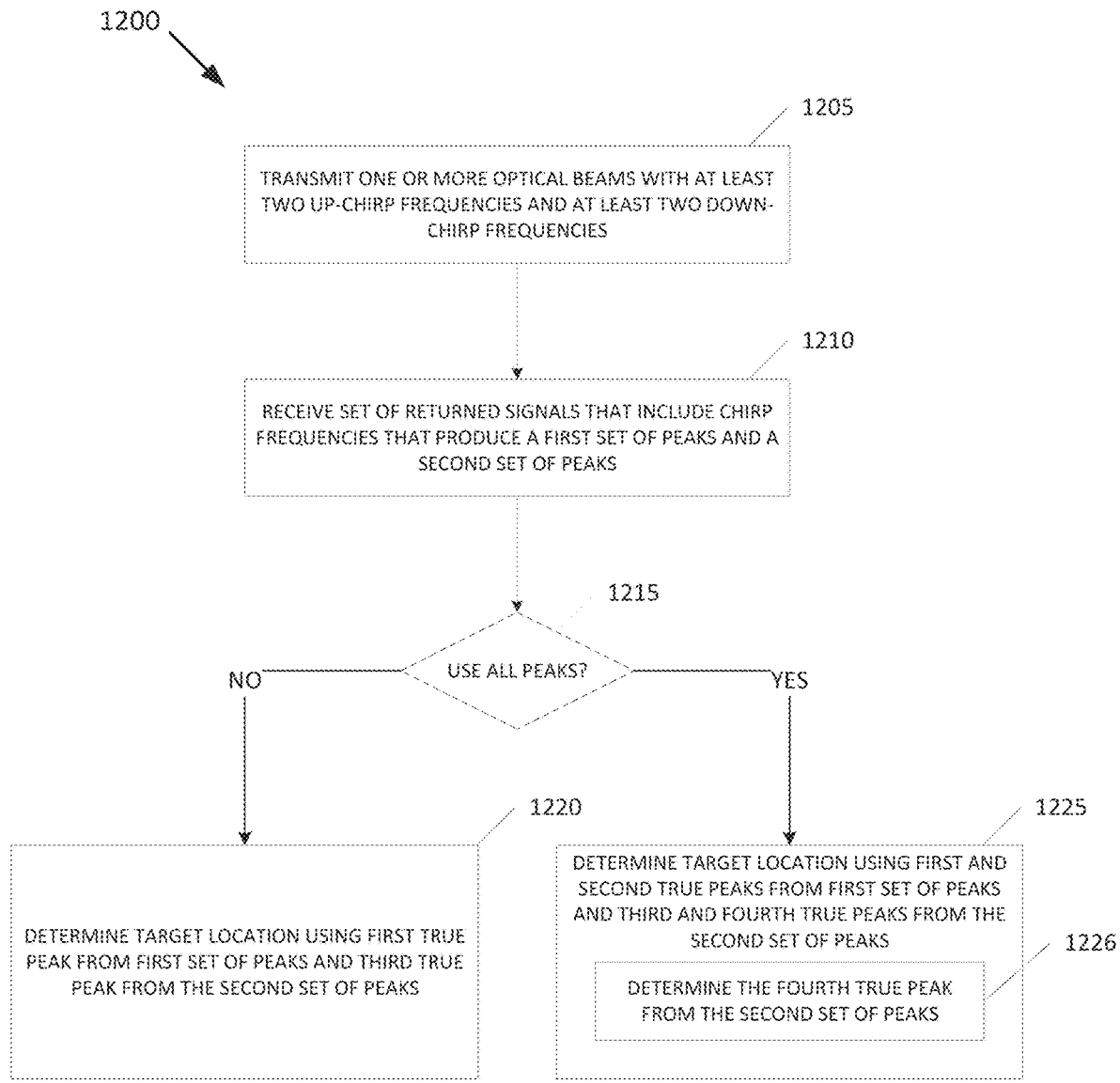
FIG. 12 is a flowchart illustrating a method for selecting peaks according to the present disclosure.

FIG. 12 is a flowchart illustrating a method 1200 in a LIDAR system, such as LIDAR system 100 or LIDAR system 300, for selecting peaks according to the present disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, the method 1200 may be performed by a signal processing system of a LIDAR system (e.g., the signal processing system 303 of the LIDAR system 300, as illustrated in FIG. 3A and FIG. 4).

Method 1200 begins at operation 1205 where the processing logic transmits one or more optical beams comprising at least two up-chirp signal modulations and at least two down-chirp signal modulations toward a target in a field of view of a light detection and ranging (LIDAR) system. At operation 1210, the processing logic receives one or more returned signals of the up-chirps and the down-chirps as reflected from the target. The processing logic may also generate a baseband signal in a frequency domain of the one or more returned signals of the up-chirps and the down-chirps, the baseband signal comprising a set of peaks associated with the target as detected by the up-chirps and the down-chirps, where the first set of peaks includes a first true peak and a second true peak, and the second set of peaks includes a third true peak and a fourth true peak.

At operation 1215, the processing logic determines whether all true peaks from the first set of peaks and the second set of peaks should be used. For example, the first set of peaks includes a first true peak (for a first up-chirp signal modulation) and a second true peak (for a second up-chirp signal modulation), and the second set of peaks includes a third true peak (for a first down-chirp signal modulation) and a fourth true peak (for a second down-chirp signal modulation). The processing logic may determine whether the location, velocity, reflectivity, etc., of a target can be determined using a subset of the true peaks from the first set of peaks and the second set of peaks. For example, the processing logic may determine whether the magnitude of the first and third true peaks are greater than a threshold. In another example, the processing logic may determine whether a confidence level/metric for the first and third peaks are greater than a threshold confidence.

If the all of the true peaks from the first set of peaks and the second set of peaks should not be used, the processing logic determines one or more of a location, a distance to a target, a velocity of the target, and a reflectivity of the target based on a subset of the true peaks in the first set of peaks and the second set of peaks. For example, the processing logic may determine one or more of a location, a distance to a target, a velocity of the target, and a reflectivity of the target based on the first true peak and the true third peak at block 1220. If the all of the true peaks from the first set of peaks and the second set of peaks should be used, the processing logic determines one or more of the location, a distance to a target, a velocity of the target, and a reflectivity of the target based on the first true peak, the second true peak, the third true peak, and the fourth true peak at block 1225. Optionally, at block 1226, the processing logic may select, determine, calculate, generate, etc., the fourth true peak from the second set of peaks at block 1226 when determining one or more of the location, a distance to a target, a velocity of the target, and a reflectivity of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   transmitting, toward a target in a field of view of a light detection and ranging (LIDAR) system, one or more optical beams comprising:
      at least two up-chirp signals; and
      at least two down-chirp signals;
   receiving, from the target, a set of returned signals based on the one or more optical beams, wherein the set of returned signals comprises:
      at least two adjusted up-chirp signals shifted from the at least two up-chirp signals by a relative motion of at least one of the target and the LIDAR system, and
      at least two adjusted down-chirp signals shifted from the at least two down-chirp signals by the relative motion of at least one of the target and the LIDAR system,
      the at least two adjusted up-chirp signals and the at least two adjusted down-chirp signals producing a first set of peaks associated with the at least two up-chirp signals corresponding to a location of the target and a second set of peaks associated with the at least two down-chirp signals corresponding to the location of the target; and
   provided each peak of the first set of peaks and each peak of the second set of peaks comprises an SNR value exceeding a threshold value, calculating at least one of the location of the target, a velocity of the target, or a reflectivity of the target based on each peak of the first set of peaks and each peak of the second set of peaks.

2. The method of claim 1, wherein the one or more optical beams are transmitted by a single optical source.

3. The method of claim 1, wherein the one or more optical beams are transmitted by at least two optical sources.

4. The method of claim 1, wherein the one or more optical beams are transmitted over one or more of multiple sweeps, multiple lines, and multiple frames.

5. The method of claim 1, wherein:
   the first set of peaks comprises a first peak and a second peak, wherein the first and second peak comprise SNR values exceeding the threshold value;
   the second set of peaks comprises a third peak and a fourth peak, wherein the third and fourth peak comprise SNR values exceeding the threshold value;
   calculating one or more of the location of the target, the velocity of the target, and the reflectivity of the target based on each peak of the first set of peaks and each peak of the second set of peaks comprises: determining at least one of the location of the target, the velocity of the target, or the reflectivity of the target based on the first peak, the second peak, the third peak, and the fourth peak of the first set of peaks and the first peak, the second peak, the third peak, and the fourth peak of the second set of peaks; or
   calculating at least one of the location of the target, the velocity of the target, or the reflectivity of the target based on the subset of the peaks comprises: determining one or more of the location of the target, the velocity of the target, and the reflectivity of the target based on the first peak and the third peak.

6. The method of claim 1, wherein:
the first set of peaks comprises a first peak and a second peak, wherein the first and second peak comprise SNR values exceeding the threshold value;
the second set of peaks comprises a third peak and a fourth peak, wherein the third and fourth peak comprise SNR values exceeding the threshold value; and
calculating at least one of the location of the target, the velocity of the target, and the reflectivity of the target using the first set of peaks and the second set of peaks comprises:
calculating at least one of the location of the target, the velocity of the target, or the reflectivity of the target, based on the first set of peaks; and
confirming at least one of the location of the target, the velocity of the target, and the reflectivity of the target, based on the second set of peaks.

7. The method of claim 1, wherein:
the first set of peaks comprises a first peak and a second peak;
the second set of peaks comprises a third peak and a group of peaks; and
the group of peaks comprises a fourth peak.

8. The method of claim 1, wherein:
the first set of peaks comprises a first peak and a second peak;
the second set of peaks comprises a third peak; and
the method further comprises determining a fourth peak based on the first peak, the second peak, and the third peak.

9. The method of claim 7, wherein determining the location of the target comprises:
selecting the fourth peak from the group of peaks; and
determining the location of the target based on the first peak, the second peak, the third peak, and the fourth peak.

10. The method of claim 9, wherein selecting the fourth peak from the group of peaks comprises:
determining an estimated peak based on the first peak and the third peak; and
selecting the fourth peak based on the estimated peak.

11. The method of claim 9, wherein selecting the fourth peak from the group of peaks comprises:
determining a first range based on the first peak and the second peak;
determining a set of ranges to the target based on the first peak, the second peak, the third peak, and the group of peaks; and
selecting the fourth peak from the group of peaks based on a minimum difference between the first range and the set of ranges.

12. The method of claim 9, wherein selecting the fourth peak from the group of peaks comprises:
determining a first Doppler shift to the target based on the first peak and the second peak;
determining a set of Doppler shifts to the target based on the third peak, and the group of peaks; and
selecting the fourth peak from the group of peaks based on a minimum difference between the first Doppler shift and the set of Doppler shifts.

13. The method of claim 7, wherein:
the at least two-adjusted up-chirp signals and the at least two adjusted down-chirp signals further produce a third set of peaks associated with the at least two up-chirp signals corresponding to a location of a second target and a fourth set of peaks associated with the at least two-down-chirp signals corresponding to the location of the second target; and
the method further comprises determining the location of the second target using the third set of peaks and the fourth set of peaks.

14. A light detection and ranging (LIDAR) system, comprising:
a processor; and
a memory to store instructions that, when executed by the processor, cause the LIDAR system to:
transmit, toward a target in a field of view of the LIDAR system, one or more optical beams comprising:
at least two up-chirp signals and at least two down-chirp signals;
receive, from the target, a set of returned signals based on the one or more optical beams, wherein the set of returned signals comprises:
at least two adjusted up-chirp signals shifted from the at least two up-chirp signals caused by a relative motion of at least one of the target and the LIDAR system, and
at least two adjusted down-chirp signals shifted from the at least two down-chirp signals caused by the relative motion of at least one of the target and the LIDAR system,
the at least two adjusted up-chirp signals and the at least two adjusted down-chirp signals producing a first set of peaks associated with the at least two up-chirp signals corresponding to a location of the target and a second set of peaks associated with the at least two down-chirp signals corresponding to the location of the target; and
provided each peak of the first set of peaks and each peak of the second set of peaks comprises an SNR value exceeding a threshold value, calculate at least one of the location of the target, a velocity of the target, or a reflectivity of the target based on each peak of the first set of peaks and each peak of the second set of peaks.

15. The LIDAR system of claim 14, wherein:
the first set of peaks comprises a first peak and a second peak;
the second set of peaks comprises a third peak and a group of peaks; and
the group of peaks comprises a fourth peak.

16. The LIDAR system of claim 15, wherein to determine the location of the target the processor is further to:
select the fourth peak from the group of peaks; and
determine the location of the target based on the first peak, the second peak, the third peak, and the fourth peak.

17. The LIDAR system of claim 16, wherein to select the fourth peak from the group of peaks the processor is further to:
determine an estimated peak based on the first peak and the third peak; and
select the fourth peak based on the estimated peak.

18. The LIDAR system of claim 16, wherein to select the fourth peak from the group of peaks the processor is further to:
determine a first range based on the first peak and the second peak;
determine a set of ranges to the target based on the first peak, the second peak, the third peak, and the group of peaks; and select the fourth peak from the group of peaks based on a minimum difference between the first range and the set of ranges.

19. The LIDAR system of claim 16, wherein to select the fourth peak from the group of peaks the processor is further to:
determine a first Doppler shift to the target based on the first peak and the second peak;
determine a set of Doppler shifts to the target based on the third peak, and the group of peaks; and
select the fourth peak from the group of peaks based on a minimum difference between the first Doppler shift and the set of Doppler shifts.

20. A light detection and ranging (LIDAR) system, comprising:
an optical scanner to:
transmit one or more optical beams comprising:
at least two up-chirp signals; and
at least two down-chirp signals
toward a target in a field of view of the LIDAR system and;
receive, from the target, a set of returned signals based on the one or more optical beams, wherein the set of returned signals comprises at least two:
adjusted up-chirp signals shifted from the at least two-up-chirp signals by a relative motion of at least one of the target and the LIDAR system, and
at least two down-chirp signals shifted from the at least two down-chirp signals by the relative motion of at least one of the target and the LIDAR system, the at least two adjusted up-chirp signals and the at least two-adjusted down-chirp signals producing a first set of peaks associated with the at least two up-chirp signals corresponding to a target location of the target and a second set of peaks associated with the at least two down-chirp signals corresponding to the location of the target;
an optical processing system coupled to the optical scanner to generate a baseband signal in a time domain from the set of return signals, the baseband signal comprising frequencies corresponding to LIDAR target ranges; and
a signal processing system coupled to the optical processing system, comprising:
a processing device; and
a memory to store instructions that, when executed by the processing device, cause the LIDAR system to:
provided each peak of the first set of peaks and each peak of the second set of peaks comprises an SNR value exceeding a threshold value, calculate at least one of the location of the target, a velocity of the target, and a reflectivity of the target based on each peak of the first set of peaks and each peak of the second set of peaks.

* * * * *